United States Patent
Yamamoto et al.

(10) Patent No.: US 8,204,785 B2
(45) Date of Patent: Jun. 19, 2012

(54) INFORMATION PROCESSING SYSTEM, PORTABLE INFORMATION TERMINAL AND ITS CONTROL METHOD, INFORMATION PROVIDING DEVICE AND ITS CONTROL METHOD, AND PROGRAM

(75) Inventors: Kazuyuki Yamamoto, Kanagawa (JP); Toshio Mamiya, Tokyo (JP); Hidetoshi Kabasawa, Saitama (JP); Katsuhiko Yamada, Tokyo (JP); Takashi Yamada, Tokyo (JP); Hideaki Kumagai, Kanagawa (JP)

(73) Assignee: Sony Corporation, Tokyo (JP)

( * ) Notice: Subject to any disclaimer, the term of this patent is extended or adjusted under 35 U.S.C. 154(b) by 1086 days.

(21) Appl. No.: 12/150,579

(22) Filed: Apr. 29, 2008

(65) Prior Publication Data

US 2010/0057571 A1 Mar. 4, 2010

(30) Foreign Application Priority Data

May 1, 2007 (JP) .................................. 2007-121205

(51) Int. Cl.
*G06Q 40/00* (2006.01)
(52) U.S. Cl. ...................................... 705/14.58; 705/30
(58) Field of Classification Search ............... 705/10–44
See application file for complete search history.

(56) References Cited

U.S. PATENT DOCUMENTS

| | | | |
|---|---|---|---|
| 6,249,740 B1 * | 6/2001 | Ito et al. | 701/420 |
| 6,721,633 B2 * | 4/2004 | Funk et al. | 701/1 |
| 7,379,876 B2 * | 5/2008 | Nakata | 704/275 |
| 8,103,510 B2 * | 1/2012 | Sato | 704/275 |
| 2002/0046212 A1 * | 4/2002 | Meifu et al. | 707/104.1 |
| 2002/0120455 A1 * | 8/2002 | Nakata | 704/275 |
| 2007/0005363 A1 * | 1/2007 | Cucerzan et al. | 704/256 |
| 2008/0243385 A1 * | 10/2008 | Yamamoto et al. | 701/300 |
| 2008/0275699 A1 * | 11/2008 | Mozer | 704/231 |
| 2009/0150160 A1 * | 6/2009 | Mozer | 704/275 |
| 2009/0177397 A1 * | 7/2009 | Routtenberg | 701/213 |
| 2009/0315766 A1 * | 12/2009 | Khosravy et al. | 342/357.07 |
| 2010/0241350 A1 * | 9/2010 | Cioffi et al. | 701/201 |

FOREIGN PATENT DOCUMENTS

| | | |
|---|---|---|
| JP | 2004-147283 A | 5/2004 |
| JP | 2006-118891 | 5/2006 |
| JP | 2007-024605 A | 2/2007 |
| JP | 2007-031875 A | 2/2007 |
| JP | 2007-064691 A | 3/2007 |
| JP | 2007-102736 A | 4/2007 |

* cited by examiner

*Primary Examiner* — Frantzy Poinvil
(74) *Attorney, Agent, or Firm* — Wolf, Greenfield & Sacks, P.C.

(57) ABSTRACT

A portable information terminal includes: a position detecting section that detects a position of the portable information terminal; a selecting section that selects a guidance target object for which voice guidance is to be provided, and detects a guidance target direction that is a direction in which the guidance target object exists with respect to a reference direction, on the basis of a direction in which the guidance target object exists with respect to the position of the portable information terminal; a voice synthesis section that generates a synthetic voice so that a guidance voice for the guidance target object selected by the selecting section is heard from the guidance target direction; and a voice output section that outputs the synthetic voice generated by the voice synthesis section.

19 Claims, 16 Drawing Sheets

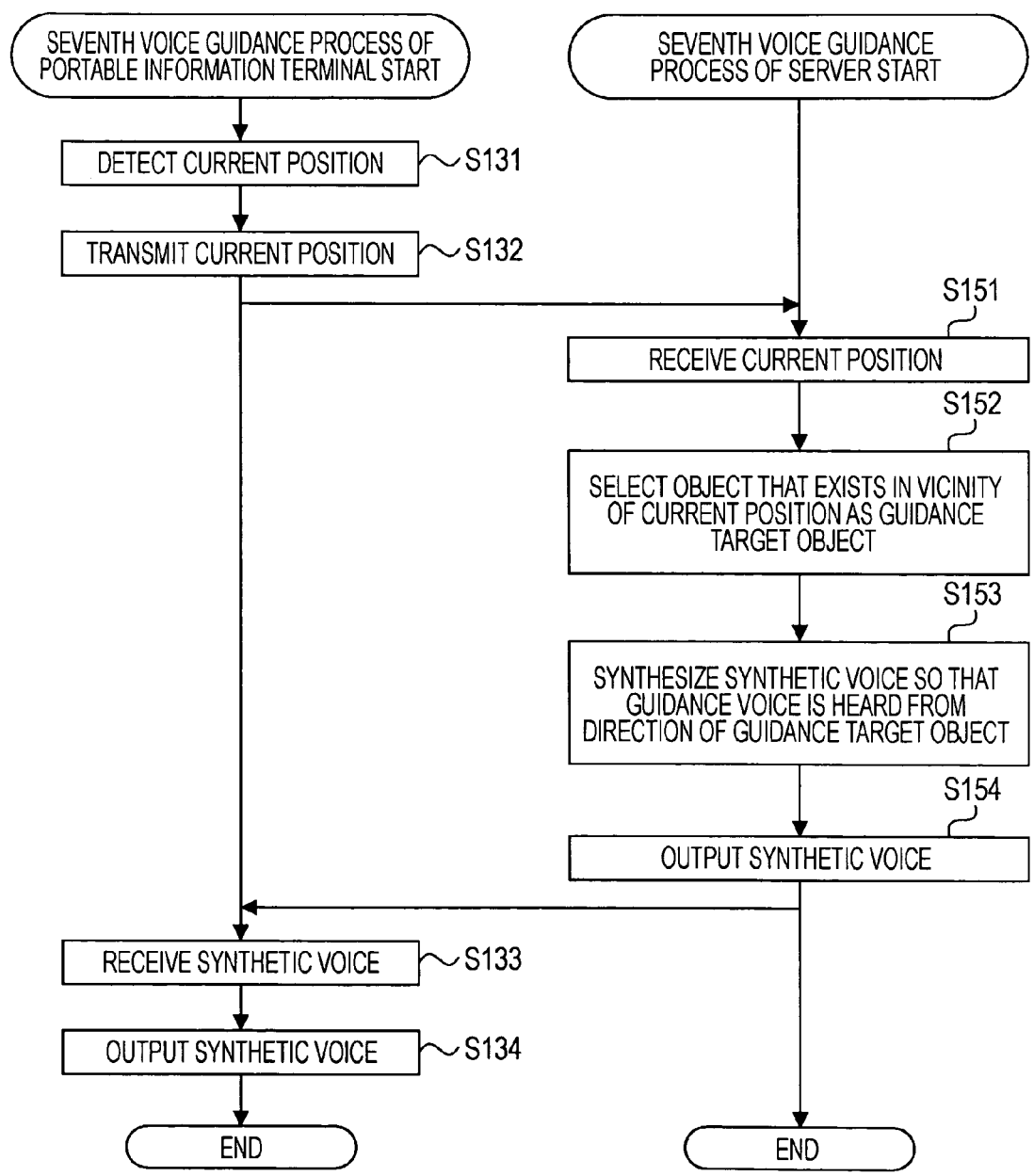

INFORMATION PROCESSING SYSTEM, PORTABLE INFORMATION TERMINAL AND ITS CONTROL METHOD, INFORMATION PROVIDING DEVICE AND ITS CONTROL METHOD, AND PROGRAM

CROSS REFERENCES TO RELATED APPLICATIONS

The present invention contains subject matter associated with Japanese Patent Application JP 2007-121205 filed in the Japanese Patent Office on May 1, 2007, the entire contents of which are incorporated herein by reference.

BACKGROUND OF THE INVENTION

1. Field of the Invention

The present invention relates to an information processing system, a portable information terminal and its control method, an information providing device and its control method, and a program. More specifically, the present invention relates to an information processing system, a portable information terminal and its control method, an information providing device and its control method, and a program, which make it easier for, for example, a portable information terminal such as a portable telephone or PDA (Personal Digital Assistant) to grasp the position of a guidance target object for which guidance is to be provided.

2. Description of the Related Art

For example, portable information terminals such as a portable telephone or PDA incorporating a GPS (Global Positioning-System) function perform navigation that includes displaying map information showing a route from the current position to a destination, or guiding the user along the route by voice.

Further, there is a method in which an electronic sound or the like of a predetermined pattern is generated in accordance with the distance between the current position and a destination, in parallel with navigation (see, for example, Japanese Unexamined Patent Application Publication No. 2006-118891).

SUMMARY OF THE INVENTION

In the case of portable telephones currently on the market, when providing guidance information such as a route to a destination, text describing the route, map information showing the route, or the like is simply displayed on a small-sized display screen typical of a portable telephone, and it is not easy for the user to check such information while moving, for example.

It is desirable to make it easier for, for example, a portable information terminal to grasp the position of a guidance target object for which guidance is to be provided.

A portable information terminal according to a first aspect (corresponding to an embodiment) of the present invention relates to a portable information terminal including: a position detecting section that detects a position of the portable information terminal; a selecting section that selects a guidance target object for which voice guidance is to be provided, and detects a guidance target direction that is a direction in which the guidance target object exists with respect to a reference direction, on the basis of a direction in which the guidance target object exists with respect to the position of the portable information terminal; a voice synthesis section that generates a synthetic voice so that a guidance voice for the guidance target object selected by the selecting section is heard from the guidance target direction; and a voice output section that outputs the synthetic voice generated by the voice synthesis section.

The voice output section may be a headphone that is worn by a user, the portable information terminal according to the first aspect of the present invention may further include a head direction detecting section that detects a head direction that is a direction in which a head of the user faces, and the voice synthesis section may generate a synthetic voice so that the guidance voice for the guidance target object is heard from a direction in which the guidance target object exists with respect to the head direction.

The portable information terminal according to the first aspect of the present invention may further include an input section that inputs a command specified by the user, and when a predetermined command is inputted by the input section, the voice synthesis section may generate a synthetic voice so that the volume of the guidance voice for the guidance target object is maintained.

The portable information terminal according to the first aspect of the present invention may further include an input section that inputs a command specified by the user, and when a predetermined command is inputted by the input section, the voice synthesis section may generate a synthetic voice so as to switch to a guidance voice for details information describing details of guidance given by the guidance voice for the guidance target object.

The portable information terminal according to the first aspect of the present invention may further include an input section that inputs a command specified by the user, and a display section that displays details information describing details of guidance given by the guidance voice for the guidance target object, when a predetermined command is input by the input section.

The portable information terminal according to the first aspect of the present invention may further include a specifying section that specifies a keyword on the basis of an instruction of a user, and the selecting section may select the guidance target object on the basis of the keyword specified by the specifying section.

The portable information terminal according to the first aspect of the present invention may further include an acquiring section that acquires position information of objects, and the selecting section may select the guidance target object, from among the objects of which the position information has been acquired by the acquiring section.

The portable information terminal according to the first aspect of the present invention may further include a storage section that stores position information of objects in advance, and the selecting section may select the guidance target object, from among the objects of which the position information is stored in the storage section.

A control method or program for a portable information terminal according to the first aspect of the present invention relates to a control method for a portable information terminal or a program for causing a computer to execute a control process for the portable information terminal, including the steps of: detecting a position of the portable information terminal; selecting a guidance target object for which voice guidance is to be provided, and detecting a guidance target direction that is a direction in which the guidance target object exists with respect to a reference direction, on the basis of a direction in which the guidance target object exists with respect to the position of the portable information terminal; generating a synthetic voice so that a guidance voice for the selected guidance target object is heard from the guidance target direction; and outputting the generated synthetic voice.

An information processing system according to a second aspect of the present invention relates to an information processing system including a portable information terminal, and an information providing device that provides information to the portable information terminal, in which: the information providing device includes a transmitting section that transmits position information of objects; and the portable information terminal includes a position detecting section that detects a position of the portable information terminal, a receiving section that receives the position information of the objects, a selecting section that selects a guidance target object for which voice guidance is to be provided, from among the objects of which the position information has been received by the receiving section, and detects a guidance target direction that is a direction in which the guidance target object exists with respect to a reference direction, on the basis of a direction in which the guidance target object exists with respect to the position of the portable information terminal, a voice synthesis section that generates a synthetic voice so that a guidance voice for the guidance target object selected by the selecting section is heard from the guidance target direction, and a voice output section that outputs the synthetic voice generated by the voice synthesis section.

In the information processing system according to the second aspect of the present invention, the portable information terminal may further include a specifying section that specifies a keyword on the basis of an instruction of a user, and the portable information terminal may provide voice guidance only for an advertisement whose contents are associated with the keyword.

In the information processing system according to the second aspect of the present invention, the portable information terminal may further include a notifying section that transmits, when a guidance voice for an advertisement for the guidance target object is used, a notification indicating that the guidance voice for the advertisement for the guidance target object has been used, to the information providing device, and the information providing device may further include a charging processing section that charges an advertiser corresponding to the guidance target object that has been used, on the basis of the notification transmitted from the notifying section of the portable information terminal.

In the information processing system according to the second aspect of the present invention, the portable information terminal may further include a notifying section that transmits a notification to the information providing device when the position of the portable information terminal detected by the position detecting section enters a predetermined area corresponding to the guidance target object after a guidance voice for an advertisement for the guidance target object is used, and the information providing device may further include a charging processing section that charges an advertiser corresponding to the guidance target object, on the basis of the notification transmitted from the notifying section of the portable information terminal.

The information processing system according to the second aspect of the present invention may further include a purchase notifying section that transmits to the information providing device a purchase notification indicating that a user of the portable information terminal has made a purchase from the advertiser corresponding to the guidance target object, and when the purchase notification associated with the guidance target object that has been used is transmitted from the purchase notifying section after the notification indicating that the guidance voice for the advertisement for the guidance target object has been used is transmitted from the notifying section, the charging processing section may charge the advertiser corresponding to the guidance target object that has been used, on the basis of the purchase notification.

An information providing device according to a third aspect of the present invention relates to an information providing device that provides information to a portable information terminal, including: a receiving section that receives a position of the portable information terminal transmitted from the portable information terminal; a selecting section that selects a guidance target object for which voice guidance is to be provided, and detects a guidance target direction that is a direction in which the guidance target object exists with respect to a reference direction, on the basis of a direction in which the guidance target object exists with respect to the position of the portable information terminal; a voice synthesis section that generates a synthetic voice so that a guidance voice for the guidance target object selected by the selecting section is heard from the guidance target direction; and a transmitting section that transmits the synthetic voice generated by the voice synthesis section, which is to be outputted by the portable information terminal, to the portable information terminal.

A control method or program for an information providing device according to the third aspect of the present invention relates to a control method for an information providing device that provides information to a portable information terminal or a program for causing a computer to execute a control process for the information providing device, including the steps of: receiving a position of the portable information terminal transmitted from the portable information terminal; selecting a guidance target object for which voice guidance is to be provided, and detecting a guidance target direction that is a direction in which the guidance target object exists with respect to a reference direction, on the basis of a direction in which the guidance target object exists with respect to the position of the portable information terminal; generating a synthetic voice so that a guidance voice for the selected guidance target object is heard from the guidance target direction; and transmitting the generated synthetic voice, which is to be outputted by the portable information terminal, to the portable information terminal.

A portable information terminal according to a fourth aspect of the present invention relates to a portable information terminal to which information is provided from an information providing device, including: a position detecting section that detects a position of the portable information terminal; a transmitting section that transmits the position of the portable information terminal detected by the position detecting section to the information providing device; a receiving section that receives from the information providing device a synthetic voice generated so that a guidance voice for a guidance target object for which guidance is to be provided is heard from a direction in which the guidance target object exists with respect to a reference direction and which is detected on the basis of the position of the portable information terminal transmitted by the transmitting section; and a voice output section that outputs the synthetic voice received by the receiving section.

A control method or program for a portable information terminal according to a fourth aspect of the present invention relates to a control method for a portable information terminal to which information is provided from an information providing device or a program for causing a computer to execute a control process for the portable information terminal, including the steps of: detecting a position of the portable information terminal; transmitting the detected position of the portable information terminal to the information providing device; receiving from the information providing device a synthetic voice generated so that a guidance voice for a guidance target object for which guidance is to be provided is heard from a direction in which the guidance target object exists with respect to a reference direction and which is detected on the basis of the transmitted position of the portable information terminal; and outputting the received synthetic voice.

In the first aspect of the present invention, a position of the portable information terminal is detected, a guidance target object for which voice guidance is to be provided is selected, a guidance target direction that is a direction in which the guidance target object exists with respect to a reference direction is detected on the basis of a direction in which the guidance target object exists with respect to the position of the portable information terminal, a synthetic voice is generated so that a guidance voice for the selected guidance target object is heard from the guidance target direction, and the generated synthetic voice is outputted.

In the second aspect of the present invention, in the information providing device, position information of objects is transmitted, and in the portable information terminal, a position of the portable information terminal is detected, the position information of the objects is received, a guidance target object for which voice guidance is to be provided is selected from among the objects of which the position information has been received, a guidance target direction that is a direction in which the guidance target object exists with respect to a reference direction is detected on the basis of a direction in which the guidance target object exists with respect to the position of the portable information terminal, a synthetic voice is generated so that a guidance voice for the guidance target object selected by the selecting section is heard from the guidance target direction, and the generated synthetic voice is outputted.

In the third aspect of the present invention, a position of the portable information terminal transmitted from the portable information terminal is received, a guidance target object for which voice guidance is to be provided is selected, a guidance target direction that is a direction in which the guidance target object exists with respect to a reference direction is detected on the basis of a direction in which the guidance target object exists with respect to the position of the portable information terminal, a synthetic voice is generated so that a guidance voice for the selected guidance target object is heard from the guidance target direction, and the generated synthetic voice, which is to be outputted by the portable information terminal, is transmitted to the portable information terminal.

In the fourth aspect of the present invention, a position of the portable information terminal is detected, the detected position of the portable information terminal is transmitted to the information providing device, a synthetic voice generated so that a guidance voice for a guidance target object for which guidance is to be provided is heard from a direction in which the guidance target object exists with respect to a reference direction and which is detected on the basis of the transmitted position of the portable information terminal, is received from the information providing device, and the received synthetic voice is outputted.

According to the first to fourth aspects of the present invention, it is possible to make it easier for, for example, a portable information terminal to grasp the position of a guidance target object for which guidance is to be provided.

BRIEF DESCRIPTION OF THE DRAWINGS

FIG. 16 is a flowchart showing a seventh voice guidance process using a server and a portable information terminal.

DESCRIPTION OF THE PREFERRED EMBODIMENTS

Figure 1:
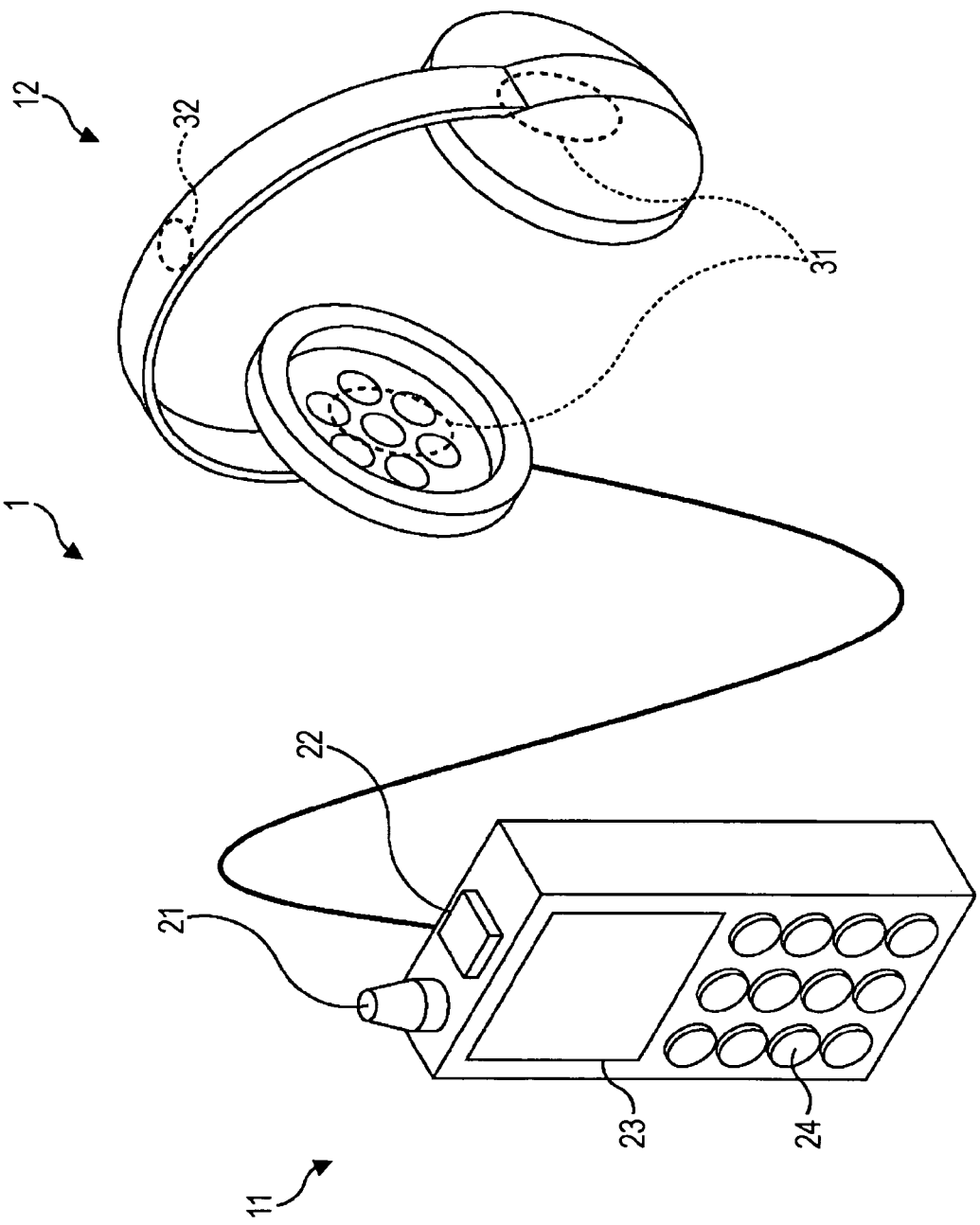
FIG. 1 is a view showing an example of the outward appearance of a portable information terminal.

Before describing an embodiment of the present invention, the correspondence between the features of the present invention and embodiments disclosed in the specification and drawings is discussed below. This description is intended to assure that an embodiment(s) supporting the present invention are described in the specification and drawings. Thus, even if an embodiment in the following description is not described as relating to a certain feature of the present invention, that does not necessarily mean that the embodiment does not relate to that feature of the present invention. Conversely, even if an embodiment is described herein as relating to a certain feature of the present invention, that does not necessarily mean that the embodiment does not relate to other features of the present invention.

A portable information terminal according to a first aspect of the present invention relates to a portable information terminal (for example, portable information terminal 1 in FIG. 2) including: a position detecting section (for example, current position detecting section 71 in FIG. 2) that detects a position of the portable information terminal; a selecting section (for example, guidance target object selecting section 73 in FIG. 2) that selects a guidance target object for which voice guidance is to be provided, and detects a guidance target direction that is a direction in which the guidance target object exists with respect to a reference direction, on the basis of a direction in which the guidance target object exists with respect to the position of the portable information terminal; a voice synthesis section (for example, DSP 65 in FIG. 2) that generates a synthetic voice so that a guidance voice for the guidance target object selected by the selecting section is heard from the guidance target direction; and a voice output section (for example, speaker 31 in FIG. 2) that outputs the synthetic voice generated by the voice synthesis section.

The voice output section may be a headphone that is worn by a user, the portable information terminal according to the first aspect of the present invention may further include a head direction detecting section (for example, head direction detecting section 72 in FIG. 2) that detects a head direction that is a direction in which a head of the user faces, and the voice synthesis section may generate a synthetic voice so that the guidance voice for the guidance target object is heard from a direction in which the guidance target object exists with respect to the head direction.

The portable information terminal according to the first aspect of the present invention may further include an input section (for example, input section 66 in FIG. 8) that inputs a command specified by the user, and when a predetermined command is inputted by the input section, the voice synthesis section may generate a synthetic voice so that the volume of the guidance voice for the guidance target object is maintained.

The portable information terminal according to the first aspect of the present invention may further include an input section (for example, input section 66 in FIG. 8) that inputs a command specified by the user, and when a predetermined command is inputted by the input section, the voice synthesis section may generate a synthetic voice so as to switch to a guidance voice for details information describing details of guidance given by the guidance voice for the guidance target object.

The portable information terminal according to the first aspect of the present invention may further include an input section (for example, input section 66 in FIG. 8) that inputs a command specified by the user, and a display section (for example, display device 23 in FIG. 8) that displays details information describing details of guidance given by the guidance voice for the guidance target object, when a predetermined command is input by the input section.

The portable information terminal according to the first aspect of the present invention may further include a specifying section (for example, keyword specifying section 111 in FIG. 4) that specifies a keyword on the basis of an instruction of a user, and the selecting section may select the guidance target object on the basis of the keyword specified by the specifying section.

The portable information terminal according to the first aspect of the present invention may further include an acquiring section (for example, control section 64 in FIG. 2) that acquires position information of objects, and the selecting section may select the guidance target object, from among the objects of which the position information has been acquired by the acquiring section.

The portable information terminal according to the first aspect of the present invention may further include a storage section (for example, memory 63 in FIG. 6) that stores position information of objects in advance, and the selecting section may select the guidance target object, from among the objects of which the position information is stored in the storage section.

Figure 3:
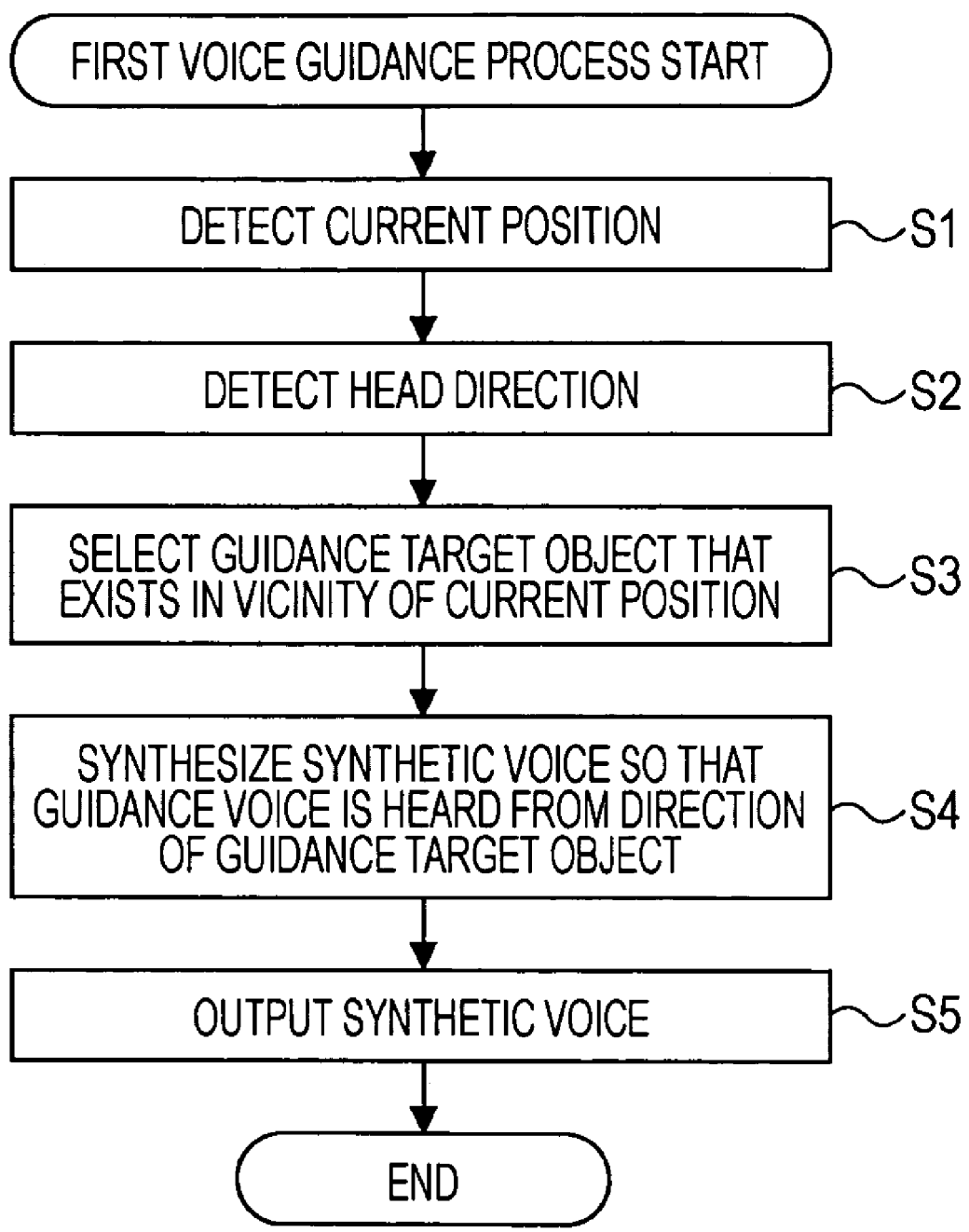
FIG. 3 is a flowchart showing a first voice guidance process using a portable information terminal.

A control method or program for a portable information terminal according to the first aspect of the present invention relates to a control method for a portable information terminal or a program for causing a computer to execute a control process for the portable information terminal, including the steps of: detecting a position of the portable information terminal (for example, step S1 in FIG. 3); selecting a guidance target object for which voice guidance is to be provided, and detecting a guidance target direction that is a direction in which the guidance target object exists with respect to a reference direction, on the basis of a direction in which the guidance target object exists with respect to the position of the portable information terminal (for example, step S3 in FIG. 3); generating a synthetic voice so that a guidance voice for the selected guidance target object is heard from the guidance target direction (for example, step S4 in FIG. 3); and outputting the generated synthetic voice (for example, step S5 in FIG. 3).

An information processing system according to a second aspect of the present invention relates to an information processing system (for example, voice guidance system 50 in FIG. 2) including a portable information terminal (for example, portable information terminal 1 in FIG. 2), and an information providing device (for example, server 51 in FIG. 2) that provides information to the portable information terminal, in which: the information providing device includes a transmitting section (for example, server 51 in FIG. 2) that transmits position information of objects; and the portable information terminal includes a position detecting section (for example, current position detecting section 71 in FIG. 2) that detects a position of the portable information terminal, a receiving section (for example, control section 64 in FIG. 2) that receives the position information of the objects, a selecting section (for example, guidance target object selecting section 73 in FIG. 2) that selects a guidance target object for which voice guidance is to be provided, from among the objects of which the position information has been received by the receiving section, and detects a guidance target direction that is a direction in which the guidance target object exists with respect to a reference direction, on the basis of a direction in which the guidance target object exists with respect to the position of the portable information terminal, a voice synthesis section (for example, DSP 65 in FIG. 2) that generates a synthetic voice so that a guidance voice for the guidance target object selected by the selecting section is heard from the guidance target direction, and a voice output section (for example, speaker 31 in FIG. 2) that outputs the synthetic voice generated by the voice synthesis section.

In the information processing system according to the second aspect of the present invention, the portable information terminal may further include a specifying section (for example, keyword specifying section 161 in FIG. 8) that specifies a keyword on the basis of an instruction of a user, and the portable information terminal may provide voice guidance only for an advertisement whose contents are associated with the keyword.

In the information processing system according to the second aspect of the present invention, the portable information terminal may further include a notifying section (for example, notifying section 165 in FIG. 8) that transmits, when a guidance voice for an advertisement for the guidance target object is used, a notification indicating that the guidance voice for the advertisement for the guidance target object has been used, to the information providing device, and the information providing device may further include a charging processing section (for example, charging processing section 151 in FIG. 8) that charges an advertiser corresponding to the guidance target object that has been used, on the basis of the notification transmitted from the notifying section of the portable information terminal.

In the information processing system according to the second aspect of the present invention, the portable information terminal may further include a notifying section (for example, notifying section 165 in FIG. 8) that transmits a notification to the information providing device when the position of the portable information terminal detected by the position detecting section enters a predetermined area corresponding to the guidance target object after a guidance voice for an advertisement for the guidance target object is used, and the information providing device may further include a charging processing section (for example, charging processing section 151 in FIG. 8) that charges an advertiser corresponding to the guidance target object, on the basis of the notification transmitted from the notifying section of the portable information terminal.

The information processing system according to the second aspect of the present invention may further include a purchase notifying section (for example, purchase notifying section 166 in FIG. 8) that transmits to the information providing device a purchase notification indicating that a user of the portable information terminal has made a purchase from the advertiser corresponding to the guidance target object, and when the purchase notification associated with the guidance target object that has been used is transmitted from the purchase notifying section after the notification indicating that the guidance voice for the advertisement for the guidance target object has been used is transmitted from the notifying section, the charging processing section may charge the advertiser corresponding to the guidance target object that has been used, on the basis of the purchase notification.

Figure 15:
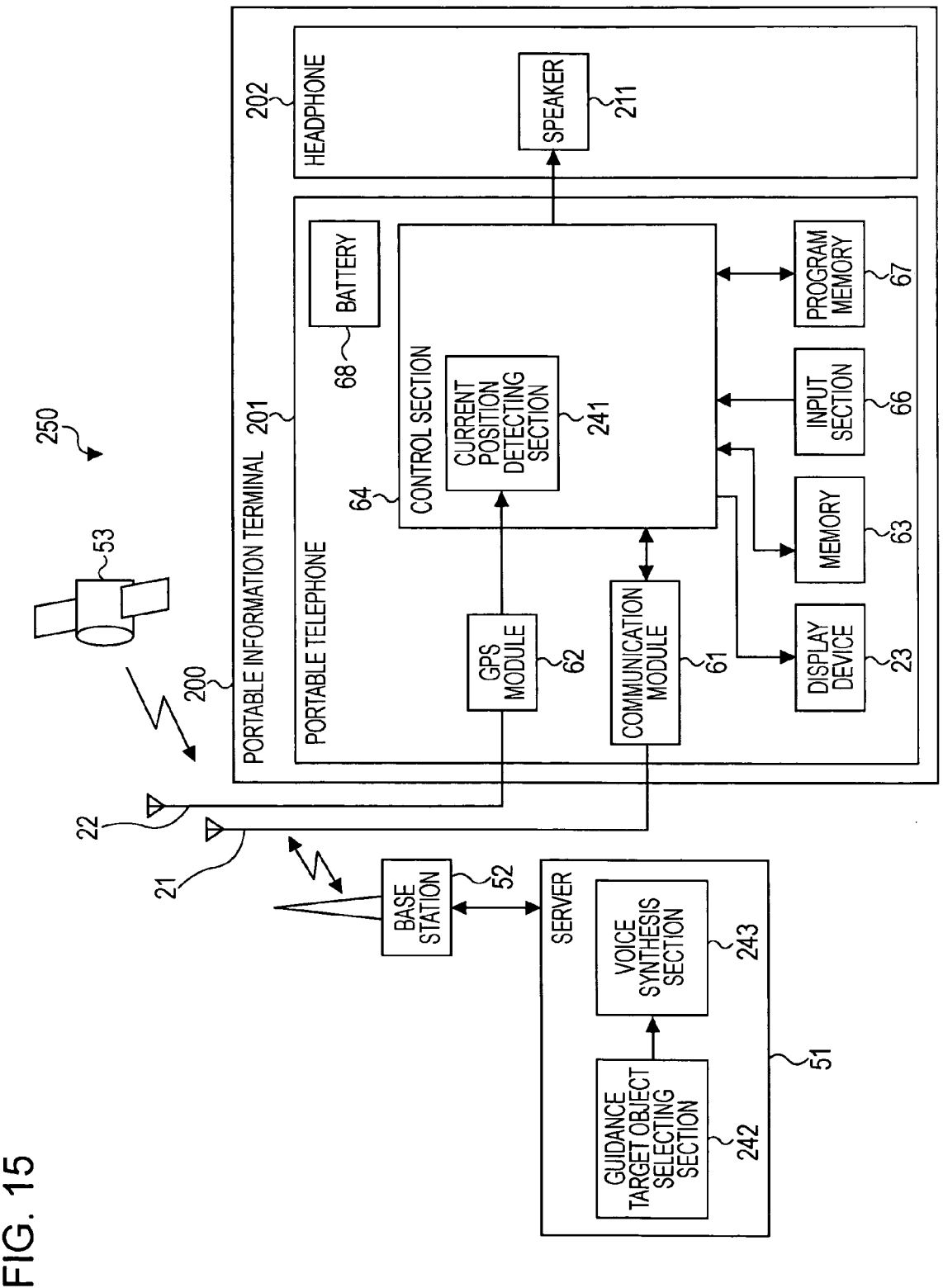
FIG. 15 is a diagram showing an example of the configuration of a voice guidance system.

An information providing device according to a third aspect of the present invention relates to an information providing device (for example, server 51 in FIG. 15) that provides information to a portable information terminal (for example, portable information terminal 200 in FIG. 15), including: a receiving section (for example, server 51 in FIG. 15) that receives a position of the portable information terminal transmitted from the portable information terminal; a selecting section (for example, guidance target object selecting section 242 in FIG. 15) that selects a guidance target object for which voice guidance is to be provided, and detects a guidance target direction that is a direction in which the guidance target object exists with respect to a reference direction, on the basis of a direction in which the guidance target object exists with respect to the position of the portable information terminal; a voice synthesis section (for example, voice synthesis section 243 in FIG. 15) that generates a synthetic voice so that a guidance voice for the guidance target object selected by the selecting section is heard from the guidance target direction; and a transmitting section (for example, server 51 in FIG. 15) that transmits the synthetic voice generated by the voice synthesis section, which is to be outputted by the portable information terminal, to the portable information terminal.

A control method or program for an information providing device according to the third aspect of the present invention relates to a control method for an information providing device (for example, server 51 in FIG. 15) that provides information to a portable information terminal (for example, portable information terminal 200 in FIG. 15) or a program for causing a computer to execute a control process for the information providing device, including the steps of: receiving a position of the portable information terminal transmitted from the portable information terminal (for example, step S151 in FIG. 16); selecting a guidance target object for which voice guidance is to be provided, and detecting a guidance target direction that is a direction in which the guidance target object exists with respect to a reference direction, on the basis of a direction in which the guidance target object exists with respect to the position of the portable information terminal (for example, step S152 in FIG. 16); generating a synthetic voice so that a guidance voice for the selected guidance target object is heard from the guidance target direction (for example, step S153 in FIG. 16); and transmitting the generated synthetic voice, which is to be outputted by the portable information terminal, to the portable information terminal (for example, step S154 in FIG. 16).

A portable information terminal according to a fourth aspect of the present invention relates to a portable information terminal (for example, portable information terminal 200 in FIG. 15) to which information is provided from an information providing device, including: a position detecting section (for example, current position detecting section 241 in FIG. 15) that detects a position of the portable information terminal; a transmitting section (for example, control section 64 in FIG. 15) that transmits the position of the portable information terminal detected by the position detecting section to the information providing device; a receiving section (for example, control section 64 in FIG. 15) that receives from the information providing device a synthetic voice generated so that a guidance voice for a guidance target object for which guidance is to be provided is heard from a direction in which the guidance target object exists with respect to a reference direction and which is detected on the basis of the position of the portable information terminal transmitted by the transmitting section; and a voice output section (for example, speaker 211 in FIG. 15) that outputs the synthetic voice received by the receiving section.

A control method or program for a portable information terminal according to a fourth aspect of the present invention relates to a control method for a portable information terminal (for example, portable information terminal 200 in FIG. 15) to which information is provided from an information providing device (for example, server 51 in FIG. 15) or a program for causing a computer to execute a control process for the portable information terminal, including the steps of: detecting a position of the portable information terminal (for example, step S131 in FIG. 16); transmitting the detected position of the portable information terminal to the information providing device (for example, step S132 in FIG. 16); receiving from the information providing device a synthetic voice generated so that a guidance voice for a guidance target object for which guidance is to be provided is heard from a direction in which the guidance target object exists with respect to a reference direction and which is detected on the basis of the transmitted position of the portable information terminal (for example, step S133 in FIG. 16); and outputting the received synthetic voice (for example, step S134 in FIG. 16).

Hereinbelow, an embodiment of the present invention will be described with reference to the drawings.

FIG. 1 shows an example of the outward appearance of a portable information terminal 1 to which the present invention is applied. The portable information terminal 1 includes a portable telephone 11 and a headphone 12 connected to each other by a detachable cable.

The portable telephone 11 has a wireless communication antenna 21, a GSP antenna 22, a display device 23, and buttons 24.

Figure 2:
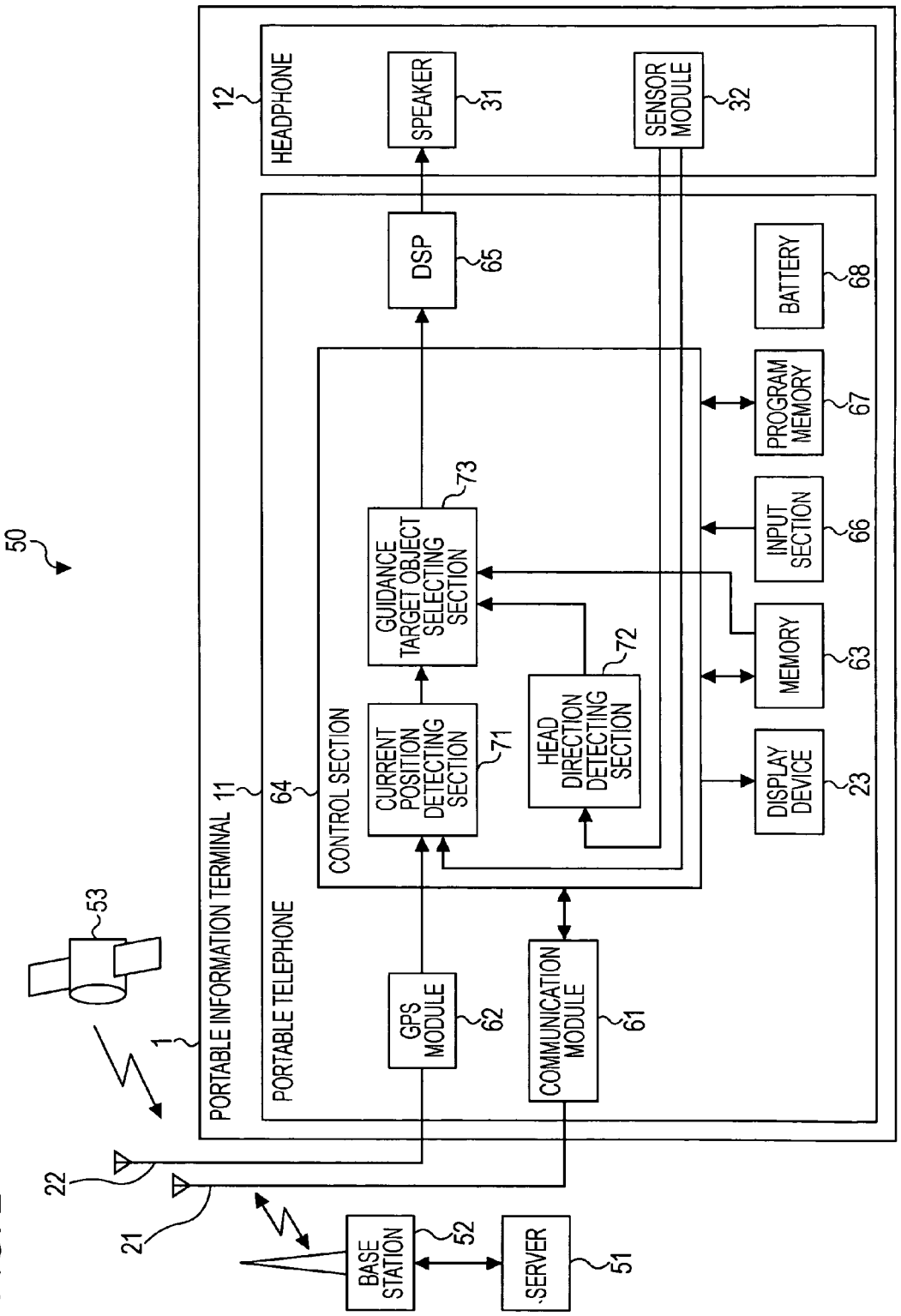
FIG. 2 is a diagram showing an example of the configuration of a voice guidance system.

The wireless communication antenna 21 transmits and receives signals of a predetermined frequency to perform wireless communication using packets with, for example, a base station such as a base station 52 shown in FIG. 2.

The GPS antenna 22 receives, for example, a GPS signal transmitted from a GPS satellite 53 shown in FIG. 2.

The display device 23 is formed by, for example, an LCD (Liquid Crystal Display) device or the like, and displays a GUI (Graphical User Interface) such as an input screen for inputting commands or the like, or predetermined information.

The buttons 24 are each formed by, for example, a numerical button for inputting a telephone number or the like, a button to which a predetermined command is assigned, or the like.

The headphone 12 includes two earpieces and an arm connecting between these earpieces. A speaker 31 is mounted inside each of the two earpieces, and a sensor module 32 is mounted in the interior of the center portion of the arm.

The sensor module 32 is formed by, for example, an acceleration sensor, an MR (Magneto Resistive) magnetic sensor, an air pressure sensor, an angular velocity (gyro) sensor, or a temperature sensor. The acceleration sensor, the MR magnetic sensor, the air pressure sensor, the angular velocity sensor, and the temperature sensor measure the vertical direction, the direction of the earth's magnetic field, the height, changes in direction, and the temperature, respectively.

Since the sensor module 32 in this example is mounted in the interior of the center portion of the arm, with the headphone 12 worn on the head of the user, the sensor module 32 can measure the orientation in the up-down direction, orientation in the left-right direction, height, changes in orientation, and temperature of the head of the user.

It should be noted that since an acceleration generated when the user suddenly moves his/her head affects the results of measurement by the acceleration sensor in the vertical direction, that is, in the up-down direction, the acceleration sensor is desirably placed at the center portion of the arm of the headphone 12 located on a rotation axis about which the user shakes his/her head to the left and right, for example. Further, since the response speed of the magnetic sensor is relatively low, the direction of the earth's magnetic field as measured by the magnetic sensor is corrected by changes in direction as measured by the angular velocity sensor whose response speed is high, thereby making it possible to find the direction of the earth's magnetic field, that is, the orientation in the left-right direction more accurately.

Since the air pressure changes gradually even in the same place, the trend of changes in the air pressure measured by the air pressure sensor is predicted, and the measured air pressure is calibrated with the predicted value, thereby making it possible to find a more accurate height.

It should be noted that the output of the temperature sensor is normally inputted to a temperature compensation circuit in the sensor module 32. The output of each sensor other than the temperature sensor is corrected in this temperature compensation circuit, and the corrected output is outputted as a measurement result from the sensor module 32. That is, the measurement value of each sensor is corrected as appropriate by using the temperature as detected by the temperature sensor, and outputted as a more accurate measurement result.

While this example adopts a configuration in which the respective sensors are integrated with the sensor module 32, alternatively, a configuration may be adopted in which the respective sensors are placed individually.

Next, referring to FIG. 2, a description will be given of an example of the configuration of a voice guidance system 50 using the portable information terminal 1.

The voice guidance system 50 includes the portable information terminal 1, a server 51, the base station 52, and the GPS satellite 53.

The portable information terminal 1 is used in such a way that, for example, the user holds the portable telephone 11 with the hand, and wears the headphone 12 on the user's head.

The portable information terminal 1 used in this way outputs from the speaker 31 of the headphone 12 a predetermined voice (hereinafter, referred to as guidance voice) associated with an object or place that exists at a predetermined position (hereinafter, referred to as object as appropriate) such as a predetermined object or place (for example, a train station or a bus stop) which exists in the vicinity of the current position of the portable information terminal 1 (portable telephone 11) detected on the basis of a GPS signal from the GPS satellite 53, to the user in such a way that the user hears the voice from the direction in which the object exists.

Hereinbelow, the above-mentioned process whereby a guidance voice for a predetermined object that exists in the vicinity of the current position is outputted so that the voice is heard from the direction in which the predetermined object exists, is referred to as a first voice guidance process.

The server 51 is, for example, a server whose clients are portable information terminals such as the portable information terminal 1 and which is managed by a predetermined information provider. In the server 51, information (hereinafter, referred to as position information) indicating the position of each of objects for which guidance can be provided in the manner as described above (hereinafter, referred to as guidance candidate objects), and data (hereinafter, referred to as guidance voice data) for generating a guidance voice are stored in association with each other. The server 51 provides these pieces of information to the portable information terminal 1 as required via the base station 52.

The base station 52 is, for example, a base station for the portable telephone 11. The base station 52 is wireless- or wire-connected to the server 51, and transmits and receives a signal of a predetermined frequency to perform, for example, wireless communication using packets with the portable telephone 11.

The GPS satellite 53 transmits a GPS signal to a GPS device such as the portable information terminal 1.

Next, referring to FIG. 2, an example of the internal configuration of the portable telephone 11 and headphone 12 will be described.

The portable telephone 11 accommodates a communication module 61, a GPS module 62, a memory 63, a control section 64, a DSP (Digital Signal Processor) 65, an input section 66, a program memory 67, and a battery 68, which are mounted onto a circuit board (not shown), for example.

The communication module 61 is a communication interface between the wireless communication antenna 21 and the control section 64. The communication module 61 supplies to the control section 64 information obtained by applying predetermined processing to a signal supplied from the wireless communication antenna 21, and supplies to the wireless communication antenna 21 a signal obtained by applying predetermined processing to information supplied from the control section 64.

The GPS module 62 calculates the latitude and longitude of the portable telephone 11 by applying predetermined processing to a GPS signal supplied from the GPS antenna 22, and supplies the calculated latitude and longitude to the control section 64.

The memory 63 is formed by, for example, a flash memory or HDD (Hard Disk Drive). The memory 63 stores the position information of guidance candidate objects and their guidance voice data supplied from the control section 64 in association with each other.

The control section 64 is formed by, for example, a MPU (Micro Processing Unit). The control section 64 controls individual components of the portable telephone 11 by executing a program stored in the program memory 67.

For example, the control section 64 supplies the position information and guidance voice data of guidance candidate objects transmitted from the server 51, which are supplied from the communication module 61, to the memory 63 for storage.

The control section 64 detects the current position of the portable telephone 11 on the basis of the latitude and longitude supplied from the GPS module 62, and the height as measured by the sensor module 32.

As described above, the portable information terminal 1 is used in such a way that the user holds the portable telephone 11 with the hand, and wears the headphone 12 on the user's head. Thus, the current position of the portable telephone 11 detected by the control section 64 indicates the current position of the user who is using the portable information terminal 1.

The control section 64 also selects, from among guidance candidate objects, an object that exists in the vicinity of the detected current position (hereinafter, referred to as guidance target object), and reads the position information and guidance voice data of the guidance target object from the memory 63. Then, on the basis of the up-down direction and the direction of the earth's magnetic field measured by the sensor module 32, the control section 64 detects the orientation in the up-down direction and orientation in the left-right direction of the user's head (hereinafter, referred to as head direction). Further, the control section 64 detects the direction in which the selected guidance target object exists with respect to the (current) position of the portable information terminal 1. On the basis of the detected direction and the head direction, the control section 64 detects the direction in which the guidance target object exists with respect to the head direction that serves as a reference (hereinafter, referred to as head guidance target direction), and supplies the resulting data to the DSP 65 together with its associated guidance voice data.

On the basis of the data of the head guidance target direction and the guidance voice data which are supplied from the control section 64, the DSP 65 generates a synthetic voice in such a way that a guidance voice is heard from the direction in which a guidance target object exists with respect to the head direction, and supplies the synthetic voice to the speaker 31 of the headphone 12.

The input section 66 supplies to the control section 64 keywords, commands, or the like corresponding to operations on a key input device such as the buttons 24 or an input voice inputted by a voice input device such as a microphone. The program memory 67 stores a program to be executed by the control section 64. The battery 68 supplies electric power to the respective components of the portable information terminal 1.

The speaker 31 of the headphone 12 outputs a synthetic voice that is transmitted via a cable from the DSP 65 of the portable telephone 11.

As described above, the sensor module 32 measures the orientation in the up-down direction, orientation in the left-right direction, height, and changes in orientation of the user's head, and supplies the measurement results to (the control section 64 of) the portable telephone 11 via a cable.

Next, an example of the functional configuration of the control section 64 will be described. The control section 64 includes a current position detecting section 71, a head direction detecting section 72, and a guidance target object selecting section 73.

The current position detecting section 71 detects the current position of the portable information terminal 1 (portable telephone 11) on the basis of the latitude and longitude that are supplied from the GPS module 62 and the height that is measured by the sensor module 32, and supplies the detected current position to the guidance target object selecting section 73.

The head direction detecting section 72 detects the head direction of the user on the basis of the up-down direction and the direction of the earth's magnetic field that are measured by the sensor module 32, and supplies the detected head direction to the guidance target object selecting section 73.

The guidance target object selecting section 73 selects a guidance target object that exists in the vicinity of the current position supplied from the current position detecting section 71, for example, and reads the position information of the guidance target object and its associated guidance voice data from the memory 63. On the basis of the detected current position and position of the guidance target object, the guidance target object selecting section 73 detects the direction in which the guidance target object exists with respect to the current position of the portable telephone 11, and on the basis of the detected direction and the head direction that is supplied from the head direction detecting section 72, detects a head guidance target direction that is the direction of the guidance target object with respect to the head direction serving as a reference. The guidance target object selecting section 73 supplies the guidance voice data for the selected guidance target object and the detected head guidance target direction to the DSP 65.

Next, referring to the flowchart of FIG. 3, the first voice guidance process using the portable information terminal 1 will be described.

In step S1, (the current position detecting section 71 of) the control section 64 of the portable telephone 11 detects the current position of the portable telephone 11 on the basis of the latitude and longitude that are supplied from the GPS module 62 and the height that is measured by the sensor module 32, and supplies the detected current position to the guidance target object selecting section 73.

In step S2, the head direction detecting section 72 detects the head direction of the user on the basis of the up-down direction and the direction of the earth's magnetic field that are measured by the sensor module 32, and supplies the detected head direction of the user to the guidance target object selecting section 73.

In step S3, the guidance target object selecting section 73 selects a guidance target object that exists in the vicinity of the detected current position, for example.

Specifically, in step S3, a certain range, for example, a range within a predetermined distance from the current position is assumed, and the guidance target object selecting section 73 selects as a guidance target object a guidance candidate object having position information indicating a position that falls within that range from among positional information of guide candidate objects stored in the memory 63, and reads the position information of that guidance target object and its associated guidance voice data.

Then, upon selecting a guidance target object in this way, the guidance target object selecting section 73 detects the direction in which the guidance target object exists with respect to the portable telephone 11 on the basis of the detected current position and position of the guidance target object, and on the basis of that direction and the head direction detected by the head direction detecting section 72, the guidance target object selecting section 73 detects a head guidance target direction that is the direction of the guidance target object with respect to the head direction serving as a reference.

The guidance target object selecting section 73 supplies the guidance voice data for the selected guidance target object and data indicating the detected head guidance target direction to the DSP 65.

In step S4, on the basis of the data of the head guidance target direction and the guidance voice data which are supplied from the control section 64, the DSP 65 generates a synthetic voice in such a way that a guidance voice is heard from the direction in which the guidance target object exists with respect to the head direction, and supplies the synthetic voice to the speaker 31 of the headphone 12.

Specifically, the DSP 65 performs adjustment of the volume, phase delay, phase, and the like with respect to the guidance voice data supplied from the guidance target object selecting section 73 to generate a synthetic voice so that a guidance voice is heard by a user facing the detected head direction from the direction of the guidance target object with respect to the head direction.

It should be noted that the synthetic voice generated by the DSP 65 is outputted not from a normal speaker but from a headphone. Thus, although in ordinary situations the synthetic voice changes as it passes through the voice path from the external ear to the eardrum, in the case of the synthetic voice generated as described above, the change in synthetic voice is corrected by signal processing so that a sound with a sense of realism such as one heard through the normal speaker can be heard through the headphone as well. While this correction is to be performed by the DSP 65 after generating a synthetic voice for a normal speaker, for example, this can alternatively be performed by a DSP provided separately from the DSP 65. Also, it is possible of course to synthesize a synthetic voice for a headphone without the synthesis of a synthetic voice for a normal speaker.

In step S5, the speaker 31 of the headphone 12 outputs the synthesized synthetic voice.

The first voice guidance process is carried out in this way. It should be noted that the first voice guidance process is carried out continuously until, for example, a predetermined period of time elapses or until a predetermined command is inputted by the input section 66 (that is, the process of steps S1 to S5 is repeatedly carried out).

As described above, the portable information terminal 1 detects the current position of the portable telephone 11 and the head direction of the user, selects a guidance target object that exists in the vicinity of the detected current position, and outputs a guidance voice associated with the guidance target object in such a way that the guidance voice is heard from the direction in which the guidance target object exists with respect to the head direction. Therefore, by using the portable information terminal 1, even a user who is not familiar with the vicinity can easily acquire information on an object that exists in its vicinity and can also grasp the position of that object.

It should be noted that a guidance voice provides information associated with a guidance target object, for example. Specifically, if the guidance target object is, for example, a bus stop, the time of departure of the next bus from the bus stop may be employed as the guidance voice.

Further, for example, if the guidance target object is a train station, the time of departure of the next train from the train station may be employed as the guidance voice. If the guidance target object is a traffic light on a road, the wait time at the traffic light may be employed as the guidance voice. If the guidance target object is a construction site, information or the like related to the construction period or the like at the construction site may be employed as the guidance voice. If the guidance target object is a facility such as a government office, for example, the use guidance of the facility may be employed as the guidance voice.

Further, information explaining the specific route from the current position to the guidance target object may be employed as the guidance voice as well.

Next, referring to FIG. 4, a description will be given of another example of the configuration of the voice guidance system 50 using the portable information terminal 1.

Figure 4:
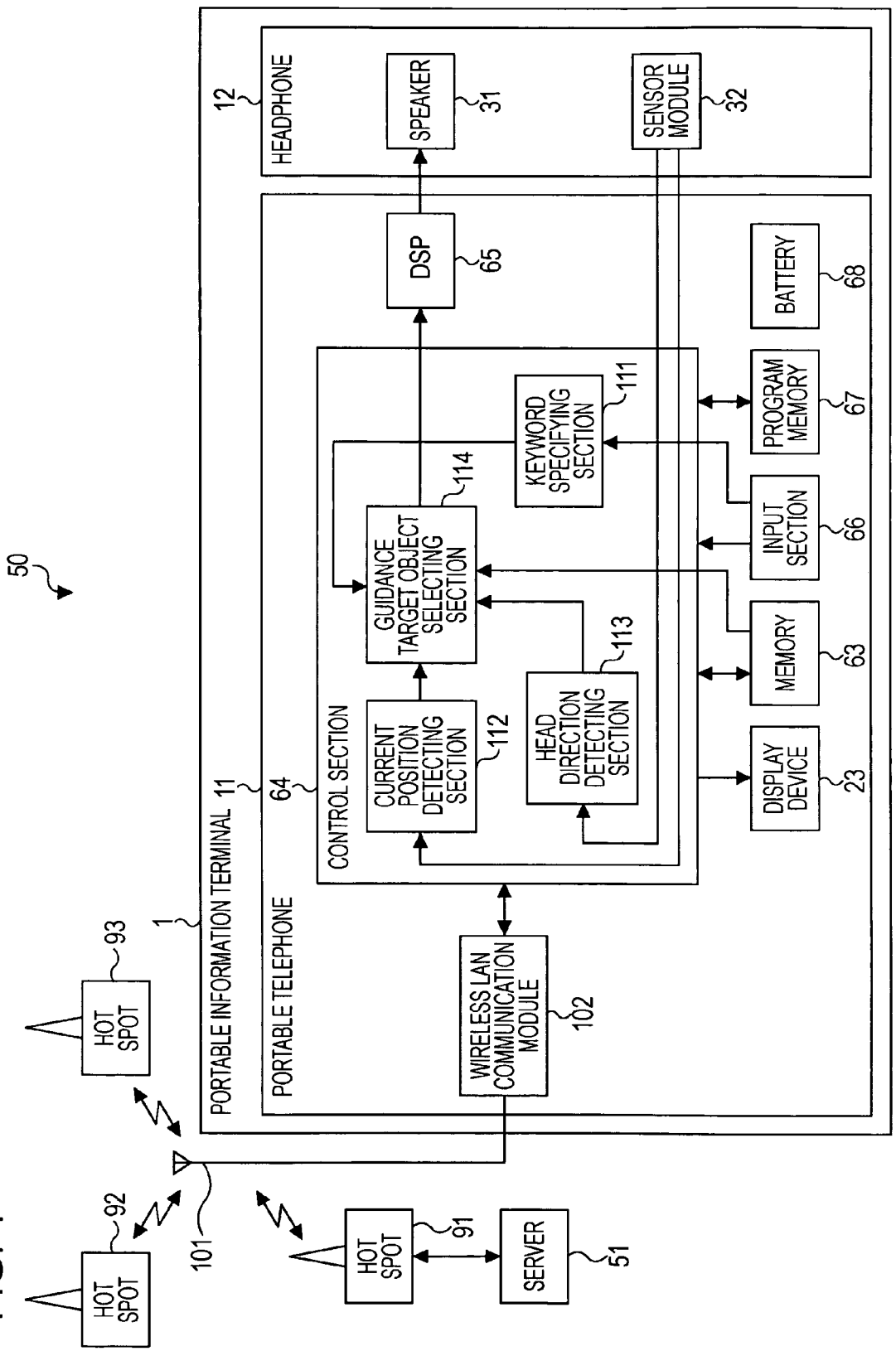
FIG. 4 is a diagram showing an example of the configuration of a voice guidance system.

It should be noted that in FIG. 4, portions corresponding to those of the voice guidance system 50 shown in FIG. 2 are denoted by the same reference numerals, and description thereof is omitted as appropriate. That is, in the voice guidance system 50 shown in FIG. 4, hot spots 91 to 93 are provided instead of the base station 52 in FIG. 2, and the GPS satellite 53 is omitted. Further, in the portable telephone 11, a wireless LAN antenna 101 is provided instead of the wireless communication antenna 21 and GPS antenna 22 of the portable telephone 11 shown in FIG. 2. In the control section 64 of the portable telephone 11, a keyword specifying section 111, a current position detecting section 112, a head direction detecting section 113, and a guidance target object selecting section 114 are provided instead of the current position detecting section 71, head direction detecting section 72, and guidance target object selecting section 73 of the control section 64 of the portable telephone 11 shown in FIG. 2.

The server 51 provides the position information and guidance voice data of each of objects for which guidance can be provided (that is, guidance candidate objects), to the portable information terminal 1 via the hot spot 91, for example.

The hot spots 91 to 93 are each formed by, for example, a wireless LAN (Local Area Network) base station, and transmits/receives a signal of a predetermined frequency to perform wireless communication with equipment such as the portable telephone 11 that is present within a radius of about 100 m from the base station.

The portable information terminal 1 selects, from among predetermined objects (for example, stores, rest rooms, public transportations, and public transportation stations) that exist in the vicinity of the current position of the portable telephone 11, an object (for example, a public transportation station) associated with a keyword (for example, vehicle) inputted by the user as a guidance target object, and outputs a guidance voice for the guidance target object to the user from the speaker 31 of the headphone 12 in such a way that the guidance voice is heard from the direction in which the guidance target object exists.

Hereinbelow, the above-mentioned process whereby a guidance voice for a guidance target object associated with a keyword specified by the user, from among predetermined objects that exist in the vicinity of the current position, is outputted in such a way that the guidance voice is heard from the direction in which the guidance target object exists, is referred to as a second voice guidance process.

The wireless LAN antenna 101 of the portable telephone 11 transmits/receives a signal of a predetermined frequency to perform wireless communication with hot spots, for example, the hot spots 91 to 93.

The wireless LAN communication module 102 is a communication interface between the wireless LAN communication antenna 101 and the control section 64. The wireless LAN communication module 102 supplies to the control section 64 information obtained by applying predetermined processing to a signal supplied from the wireless LAN communication antenna 101, and supplies to the wireless LAN communication antenna 101 a signal obtained by applying predetermined processing to information supplied from the control section 64.

The keyword specifying section 111 of the control section 64 of the portable telephone 11 specifies a predetermined keyword on the basis of a user's instruction made via the input section 66, for example, and supplies the keyword to the guidance target object selecting section 114.

The current position detecting section 112 calculates the latitude and longitude of the portable telephone 11 from the position information of the hot spots 91 to 93 that have performed communication with the wireless LAN communication module 102 and a delay of a signal from each of the hot spots 91 to 93 or the like. Also, the current position detecting section 112 detects the current position of the portable telephone 11 on the basis of the calculated latitude and longitude, and the height measured by the sensor module 32, and supplies the detected current position to the guidance target object selecting section 114.

The head direction detecting section 113 detects the head direction of the user on the basis of the up-down direction and the direction of the earth's magnetic field that are measured by the sensor module 32, and supplies the detected head direction to the guidance target object selecting section 114.

The guidance target object selecting section 114 selects, from among guidance candidate objects that exist in the vicinity of the current position detected by the current position detecting section 112, a guidance candidate object associated with a keyword specified by the keyword specifying section 111 as a guidance target object, and reads the position information of the selected guidance target object and guidance voice data explaining the route from the current position to the guidance target object, from the memory 63. Then, on the basis of the detected current position and position of the guidance target object, the guidance target object selecting section 114 detects the direction in which the guidance target object exists with respect to the portable telephone 11, and on the basis of the detected direction and the head direction supplied from the head direction detecting section 113, detects a head guidance target direction that is the direction of the guidance target object with respect to the head direction.

The guidance target object selecting section 114 supplies the data of the detected head guidance target direction to the DSP 65 together with its associated guidance voice data.

Figure 5:
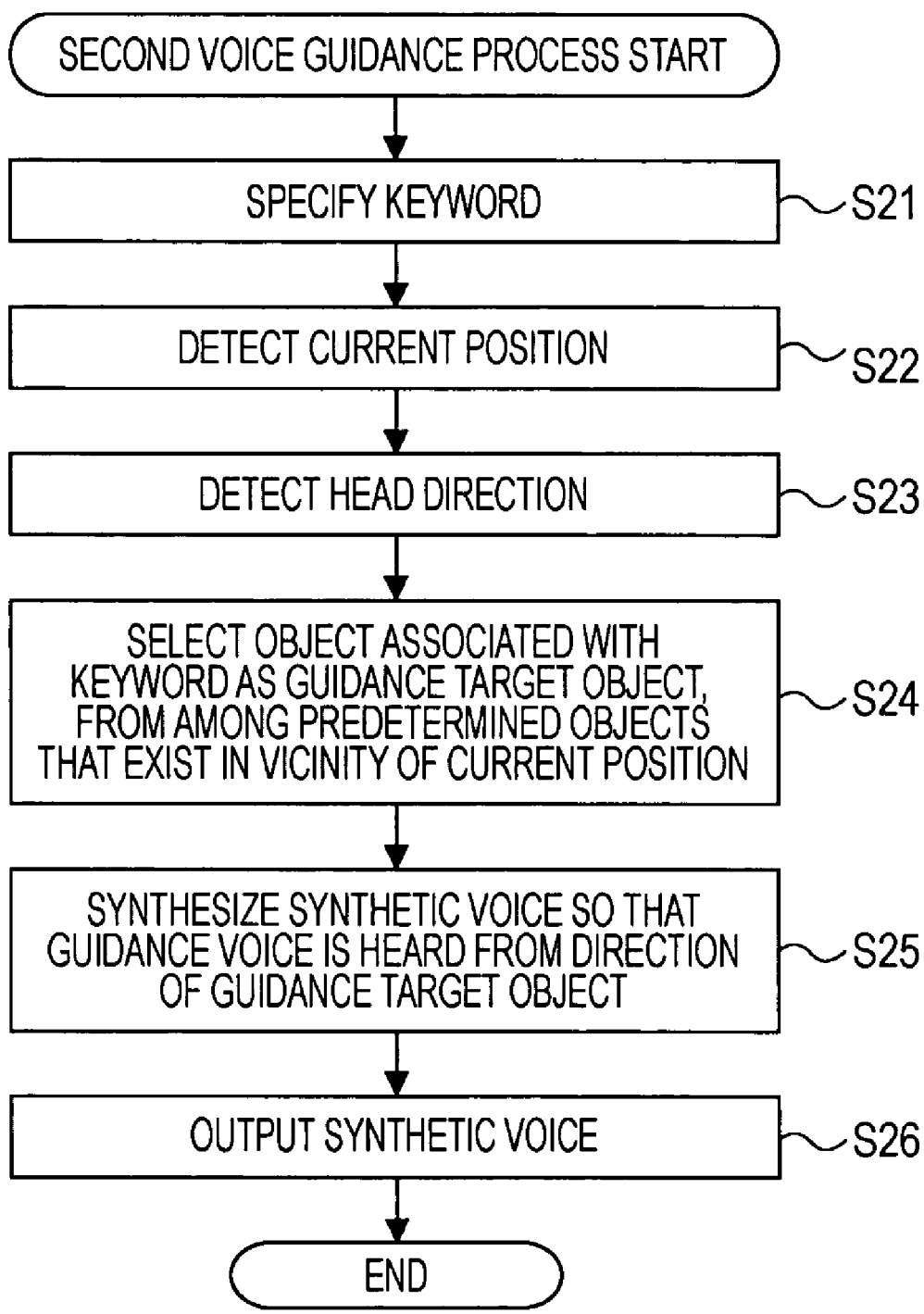
FIG. 5 is a flowchart showing a second voice guidance process using a portable information terminal.

Next, referring to the flowchart of FIG. 5, the second voice guidance process with the portable information terminal 1 will be described.

In step S21, (the keyword specifying section 111 of) the control section 64 of the portable telephone 11 specifies a predetermined keyword on the basis of a user's instruction made via the input section 66, and supplies the keyword to the guidance target object selecting section 114.

In step S22, the current position detecting section 112 calculates the latitude and longitude of the portable telephone 11 from the position information of the hot spots 91 to 93 that have performed communication with the wireless LAN communication module 102 and a delay of a signal from each of the hot spots 91 to 93. Also, the current position detecting section 112 detects the current position of the portable telephone 11 on the basis of the calculated latitude and longitude, and the height measured by the sensor module 32, and supplies the detected current position to the guidance target object selecting section 114.

In step S23, the head direction detecting section 113 detects the head direction of the user on the basis of the up-down direction and the direction of the earth's magnetic field that are measured by the sensor module 32, and supplies the detected head direction to the guidance target object selecting section 114.

In step S24, the guidance target object selecting section 114 references the memory 63 and selects, from among predetermined objects associated with the specified keyword, an object that exists in the vicinity of the detected current position as a guidance target object. The guidance target object selecting section 114 then reads from the memory 63 the position information of the selected guidance target object, and guidance voice data explaining the route from the current position to the guidance target object.

Specifically, the guidance target object selecting section 114 selects guidance candidate objects each including a specified keyword (for example, rest room) in its attributes (for example, name, genre, and the like), from among guidance candidate objects stored in the memory 63. Further, the guidance target object selecting section 114 selects guidance candidate objects having position information indicating, for example, the three positions located closest to the current position from among the position information of the selected guidance candidate objects stored in the memory 63, and reads the position information of each of those guidance target objects and its associated guidance voice data.

Upon selecting the guidance target object in this way, the guidance target object selecting section 114 detects the direction in which the guidance target object exists with respect to the portable telephone 11 on the basis of the detected current position and position of the guidance target object, and on the basis of the detected direction and the head direction detected by the head direction detecting section 113, detects a head guidance target direction that is the direction of the guidance target object with respect to the head direction. The guidance target object selecting section 114 supplies the data of the detected head guidance target direction to the DSP 65 together with its associated guidance voice data.

In step S25, as in the process of step S4 in FIG. 3, on the basis of the data of the head guidance target direction and the guidance voice data which are supplied from the control section 64, the DSP 65 generates a synthetic voice in such a way that a guidance voice is heard from the direction in which the guidance target object exists with respect to the head direction, and supplies the synthetic voice to the speaker 31 of the headphone 12.

In step S26, the speaker 31 of the headphone 12 outputs the synthesized synthetic voice.

The second voice guidance process is carried out in this way. It should be noted that this second voice guidance process is carried out continuously until, for example, a predetermined period of time elapses or until a predetermined command is inputted by the input section 66 (that is, the process of steps S21 to S26 is repeatedly carried out).

As described above, the portable information terminal 1 detects the current position of the portable telephone 11 and the head direction of the user, selects as a guidance target object a guidance candidate object associated with a specified keyword, from among guidance candidate objects that exist in the vicinity of the detected current position, and outputs a guidance voice related to the guidance target object in such a way that the guidance voice is heard from the direction in which the guidance target object exists with respect to the head direction. Therefore, the user can easily acquired information on an object of interest, and also can easily grasp the position of the object.

In the voice guidance system 50 described above, the portable telephone 11 acquires the position of an object in its vicinity or its associated guidance voice data via a hot spot near the portable telephone 11. However, an alternative arrangement is also possible in which, for example, a communication section such as a wireless tag is given to each object and the position and guidance voice data of each object is retained, and the portable telephone 11 and an object in its proximity perform direct wireless communication without the intermediation of a base station or the like, thus allowing the portable telephone 11 to acquire the position and guidance voice data of each object.

Next, referring to FIG. 6, a description will be given of another example of the configuration of the voice guidance system 50 using the portable information terminal 1.

Figure 6:
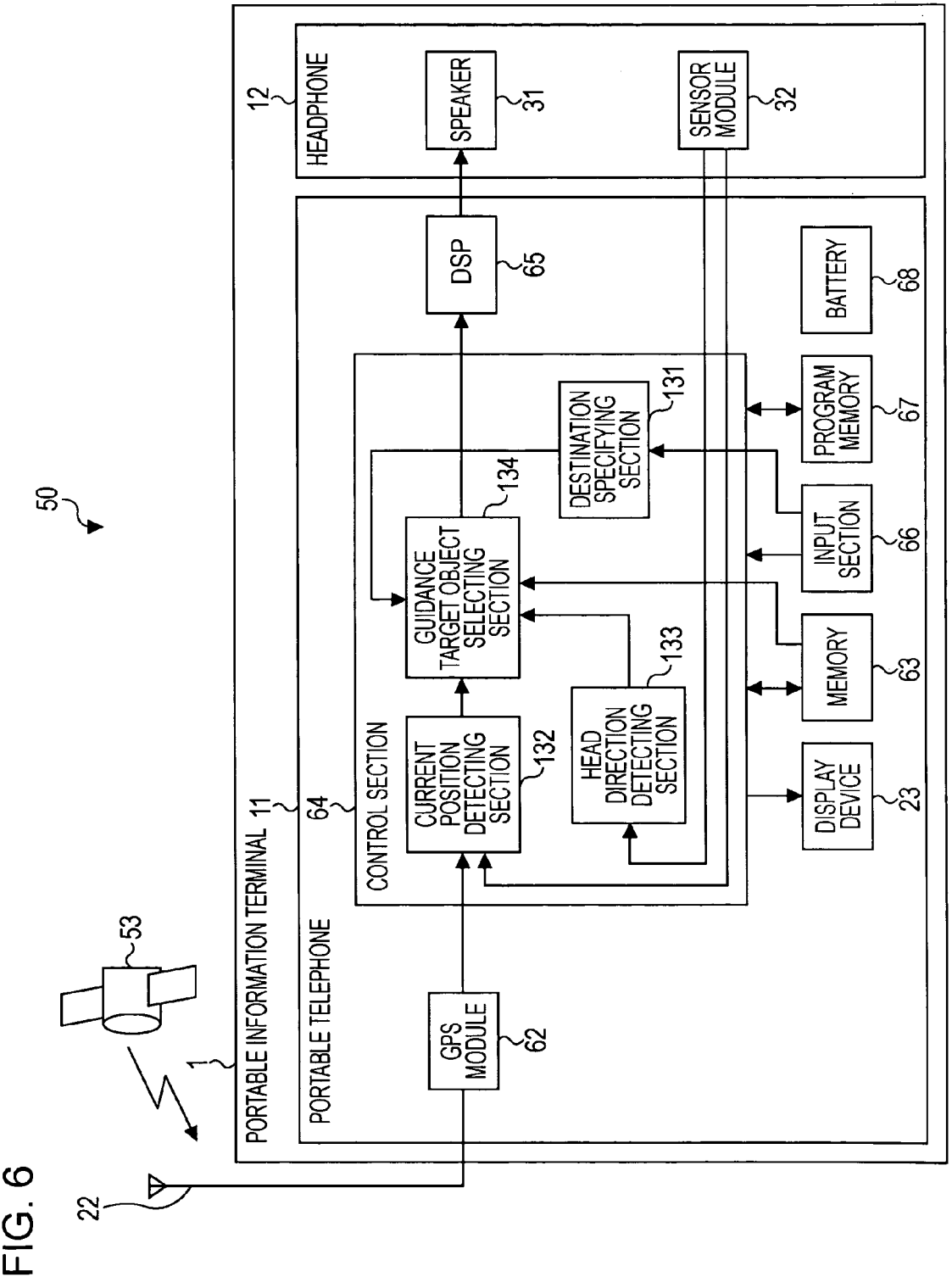
FIG. 6 is a diagram showing an example of the configuration of a voice guidance system.

It should be noted that in FIG. 6, portions corresponding to those of the voice guidance system 50 shown in FIG. 2 are denoted by the same reference numerals, and description thereof is omitted as appropriate. That is, in the voice guidance system 50 shown in FIG. 6, the server 51 and base station 52 of the voice guidance system 50 shown in FIG. 2 are omitted. Further, in the portable telephone 11 shown in FIG. 6, the wireless communication antenna 21 and communication module 61 of the portable telephone 11 shown in FIG. 2 are omitted, and in the control section 64 of the portable telephone 11 shown in FIG. 6, a destination specifying section 131, a current position detecting section 132, and a head direction detecting section 133 are provided instead of the current position detecting section 71, head direction detecting section 72, and guidance target object selecting section 73 of the control section 64 shown in FIG. 2.

In the example shown in FIG. 6, the portable information terminal 1 allows the user to specify a predetermined destination, and the portable information terminal 1 sequentially places virtual guidance target objects corresponding to the position of the user who is moving on the route from the current position to the specified destination, and outputs a guidance voice for each of the guidance target objects to the user from the speaker 31 of the headphone 12 in such a way that the guidance voice is heard from the direction in which the guidance target object exists.

Hereinbelow, the above-mentioned process whereby a guidance voice for a guidance target object specified by the user is outputted in such a way that the guidance voice is heard from the direction in which the guidance target object is present, is referred to as a third voice guidance process.

In the case of this example, the memory 63 of the portable information terminal 1 stores predetermined guidance voice data and map information in advance.

The destination specifying section 131 specifies a destination on the basis of a user's instruction made via the input section 66, for example, and supplies the specified destination to the guidance target object selecting section 134.

The current position detecting section 132 detects the current position of the portable telephone 11 on the basis of the latitude and longitude that are supplied from the GPS module 62 and the height that is measured by the sensor module 32, and supplies the detected current position to the guidance target object selecting section 134.

The head direction detecting section 133 detects the head direction of the user on the basis of the up-down direction and the direction of the earth's magnetic field that are measured by the sensor module 32, and supplies the detected head direction to the guidance target object selecting section 134.

The guidance target object selecting section 134 references the map information stored in the memory 63, for example, to find the route from the current position detected by the current position detecting section 132 to the destination specified by the destination specifying section 131, and places a virtual guidance target object at a predetermined distance from the current position on the route. Then, on the basis of the detected current position and position of the guidance target object, the guidance target object selecting section 134 detects the direction in which the guidance target object exists with respect to the portable telephone 11, and on the basis of the detected direction and the head direction supplied from the head direction detecting section 133, detects a head guidance target direction that is the direction of the guidance target object with respect to the head direction. The guidance target object selecting section 134 then supplies the data of the detected head guidance target direction to the DSP 65 together with predetermined guidance voice data of a guidance voice.

Figure 7:
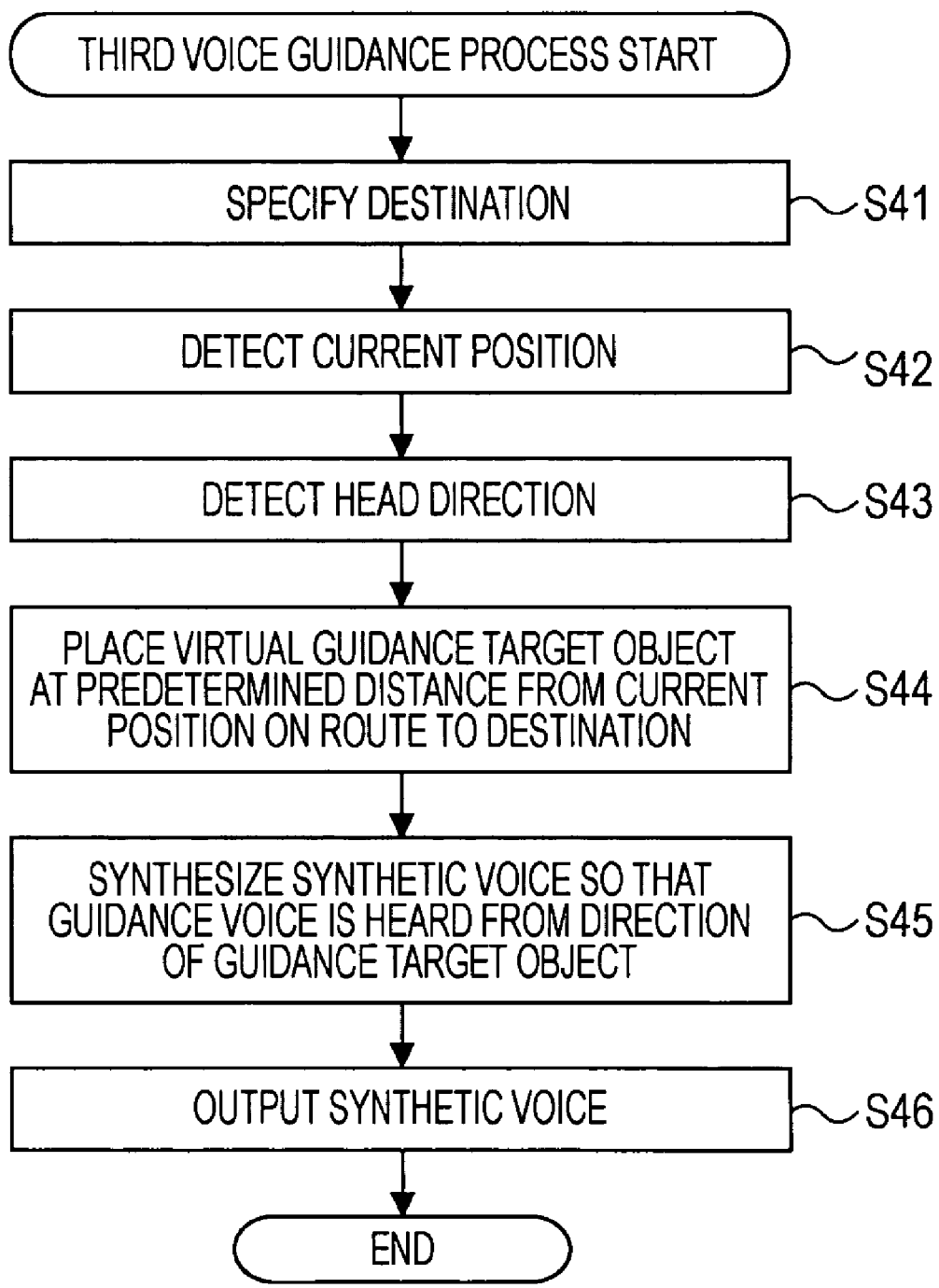
FIG. 7 is a flowchart showing a third voice guidance process using a portable information terminal.

Next, referring to the flowchart of FIG. 7, the third voice guidance process using the portable information terminal 1 will be described.

In step S41, the destination specifying section 131 specifies a predetermined destination on the basis of a user's instruction made via the input section 66, and supplies the specified destination to the guidance target object selecting section 134.

In step S42, the current position detecting section 132 detects the current position of the portable telephone 11 on the basis of the latitude and longitude that are supplied from the GPS module 62 and the height that is measured by the sensor module 32, and supplies the detected current position to the guidance target object selecting section 134.

In step S43, the head direction detecting section 133 detects the head direction of the user on the basis of the up-down direction and the direction of the earth's magnetic field that are measured by the sensor module 32, and supplies the detected head direction to the guidance target object selecting section 134.

In step S44, the guidance target object selecting section 134 references map information stored in the memory 63, for example, to find the route from the detected current position to the specified destination, and places a virtual guidance target object at a predetermined distance from the current position on the route. Then, on the basis of the detected current position and position of the guidance target object, the guidance target object selecting section 134 detects the direction in which the guidance target object exists with respect to the portable telephone 11, and on the basis of the detected direction and the head direction detected by the head direction detecting section 133, detects a head guidance target direction that is the direction of the guidance target object with respect to the head direction. The guidance target object selecting section 134 then supplies the data of the detected head guidance target direction to the DSP 65 together with predetermined guidance voice data of a guidance voice.

It is assumed that the guidance target object selecting section 134 reads the predetermined guidance voice data from the memory 63 in advance.

As the predetermined guidance voice, for example, a voice saying "here" for guiding the user toward the direction of the voice, a simple beep sound, or the like may be used.

In step S45, as in the process of step S4 in FIG. 3, on the basis of the data of the head guidance target direction and the guidance voice data which are supplied from the control section 64, the DSP 65 generates a synthetic voice in such a way that the guidance voice is heard from the direction in which a guidance target object exists with respect to the head direction, and supplies the synthetic voice to the speaker 31 of the headphone 12.

In step S46, the speaker 31 of the headphone 12 outputs the synthesized synthetic voice.

The third voice guidance process is carried out in this way.

It should be noted that the third voice guidance process is carried out continuously until, for example, a predetermined period of time elapses or until a predetermined command is inputted by the input section 66 (that is, the process of steps S41 to S46 is repeatedly carried out).

As described above, the portable information terminal 1 specifies a predetermined destination, detects the current position and the head direction of the user, places a virtual guidance target object sequentially at a predetermined distance from the current position on the route from the detected current position to the specified destination, and outputs a predetermined guidance voice in such a way that the guidance voice is heard from the direction in which the guidance target object exists with respect to the head direction. Therefore, the direction in which the guidance target object is present, that is, the direction of travel to be taken can be easily grasped.

While it is hard for the user to perceive subtle differences in the direction from which a guidance voice is heard, in this case, a guidance voice is heard not from the destination but from the direction of travel to be taken.

Therefore, even if the destination is far from the current position, the user can easily grasp, for example, which way to turn at a corner.

In the above-described third voice guidance process, a predetermined guidance voice not related to a position is adopted as the guidance voice. Alternatively, for example, a guidance voice corresponding to the current position, an object located near the current position, or the like, such as "turn left at the intersection with a gas station" may be adopted as the guidance voice.

In the above-described example, a virtual guidance target object is assumed and is sequentially placed.

However, it is also possible to sequentially select as a guidance target object an actual object in the vicinity of a route located close to the current position, and output a guidance voice in such a way that the guidance voice is heard from the selected guidance target.

Next, referring to FIG. 8, a description will be given of another example of the configuration of the voice guidance system 50 using the portable information terminal 1.

Figure 8:
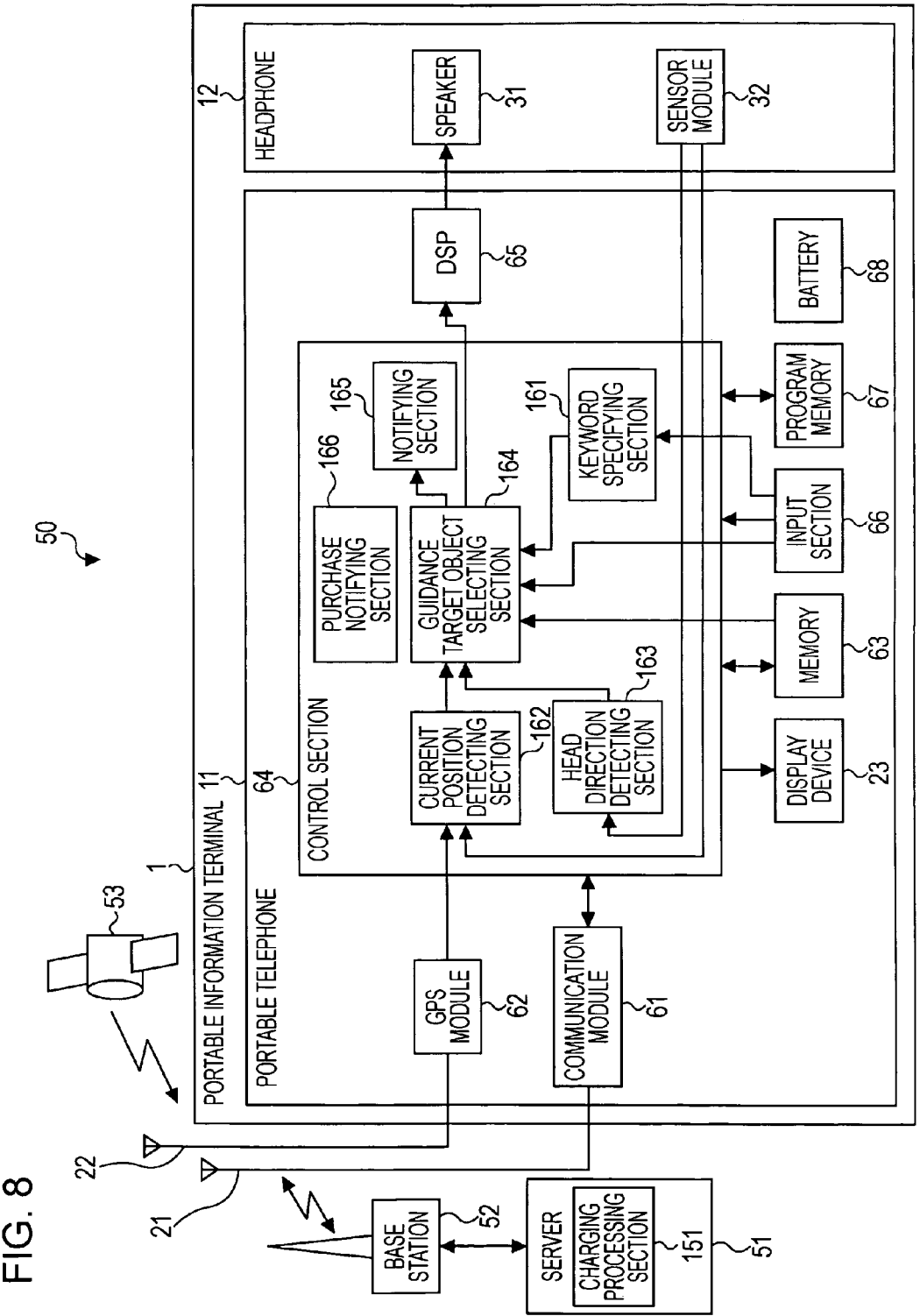
FIG. 8 is a diagram showing an example of the configuration of a voice guidance system.

It should be noted that in FIG. 8, portions corresponding to those of the voice guidance system 50 shown in FIG. 2 are denoted by the same reference numerals, and description thereof is omitted as appropriate. In the server 51, a charging processing section 151 is provided. Also, in the control section 64 of the portable telephone 11, a keyword specifying section 161, a current position detecting section 162, a head direction detecting section 163, a guidance target object selecting section 164, a notifying section 165, and a purchase notifying section 166 are provided instead of the current position detecting section 71, head direction detecting section 72, and guidance target object selecting section 73 of the control section 64 shown in FIG. 2.

For example, upon receiving a notification from a portable information terminal such as the portable information terminal 1 that a voice guidance has been provided with respect to a predetermined object (for example, the store or the like of an advertiser who has commissioned an information provider managing the server 51 to place a voice advertisement through this voice guidance) (hereinafter, referred to advertisement target object), the charging processing section 151 of the server 51 charges predetermined advertising rates to the advertiser.

The portable information terminal 1 selects, from among advertisement target objects that exist within a predetermined range from the current position of the portable telephone 11, an object associated with a keyword (for example, "boutique") inputted by the user (for example, the advertisement target object of an advertiser who has commissioned an advertisement for the boutique to be placed) as a guidance target object, and outputs a guidance voice for the guidance target object (for example, a guidance voice of the selected advertisement for the boutique) to the user from the speaker 31 of the headphone 12 in such a way that the guidance voice is heard from the direction in which the guidance target object exists.

The portable information terminal 1 also specifies, from among selected guidance target objects, a guidance target object that is present in the head direction detected by the head direction detecting section 163 as an emphasized guidance target object. In order to ensure that the guidance voice for the guidance target object specified as an emphasized guidance target object be heard such that the guidance voice is emphasized over the guidance voices for other guidance target objects, the portable information terminal 1 outputs the guidance voice for the emphasized guidance target object from the speaker 31 of the headphone 12 while increasing its volume, or muting (silencing) the volumes of the guidance voices for other guidance target objects or making the volumes negligibly small.

When voice guidance (in particular, emphasized voice guidance) has been provided with respect to a guidance target object, the portable information terminal 1 notifies the server 51 to that effect.

Hereinbelow, the above-mentioned process whereby a guidance voice for a guidance target object associated with a keyword specified by the user, from among predetermined objects that exist in the vicinity of the current position, is outputted in such a way that the guidance voice is heard from the direction in which the guidance target object exists, and a notification is given to that effect, is referred to as a fourth voice guidance process.

The keyword specifying section 161 of the control section 64 of the portable telephone 11 specifies a predetermined keyword on the basis of a user's instruction made via the input section 66, and supplies the keyword to the guidance target object selecting section 164.

The current position detecting section 162 detects the current position of the portable telephone 11 on the basis of the latitude and longitude that are supplied from the GPS module 62 and the height that is measured by the sensor module 32, and supplies the detected current position to the guidance target object selecting section 164.

The head direction detecting section 163 detects the head direction of the user on the basis of the up-down direction and the direction of the earth's magnetic field that are measured by the sensor module 32, and supplies the detected head direction to the guidance target object selecting section 164.

The guidance target object selecting section 164 selects, from among advertisement target objects that exist within a predetermined range from the current position detected by the current position detecting section 162, an advertisement target object associated with a keyword specified by the keyword specifying section 161 as a guidance target object, and reads the position information of the selected guidance target object and the guidance voice data of an advertisement for the guidance target object from the memory 63.

It is assumed that identifying information for identifying an advertisement target object or advertiser is already assigned to the position information and guidance voice data of a guidance target object at the time of the provision of these pieces of information.

Further, the guidance target object selecting section 164 detects the direction in which the guidance target object exists with respect to the portable telephone 11 on the basis of the detected current position and position of the guidance target object, and on the basis of the detected direction and the head direction detected by the head direction detecting section 163, detects a head guidance target direction that is the direction of the guidance target object with respect to the head direction.

Further, the guidance target object selecting section 164 specifies, from among guidance target objects, a guidance target object that is present in the head direction detected by the head direction detecting section 163 as an emphasized guidance target object.

It should be noted that upon input of a predetermined command (details command described later) from the input section 66, the guidance target object selecting section 164 fixes (always fixes) a guidance target object (guidance target object specified as an emphasized guidance target object) that is present in the head direction at that time as an emphasized guidance target object, and can switch a guidance voice for the fixed guidance target object to a guidance voice for details information describing an advertisement for that guidance target object.

Also, upon input of a predetermined command (lock command described later) from the input section 66, the guidance target object selecting section 164 can fix (always fix) a guidance target object (guidance target object specified as an emphasized guidance target object) that is present in the head direction at that time as an emphasized guidance target object.

The guidance target object selecting section 164 supplies the data of the head guidance target direction and the guidance voice data of an advertisement for the guidance target object detected in this way to the DSP 65. It is assumed that the data of the head guidance target direction and guidance voice data of the guidance target object that is specified as an emphasized guidance target object are each assigned information that indicates that the data is that of an emphasized guidance target object.

When, for example, it is regarded that a guidance target object has been specified by the guidance target object selecting section 164 as an emphasized guidance target object for, for example, a predetermined period of time or more and that a guidance voice for its advertisement has been outputted, the notifying section 165 transmits a notification indicating that the voice guidance for that advertisement target object has been emphasized, to the server 51 via the base station 52, for example. It should be noted that information indicating the time at which the specifying of an emphasized guidance target object is started may be further notified.

When, for example, the user of the portable information terminal 1 makes a purchase from an advertiser corresponding to an advertisement target object that has been used, by means of the electronic payment function of the portable information terminal 1, the purchase notifying section 166 transmits a purchase notification to that effect to the server 51 via the base station 52.

Figure 9:
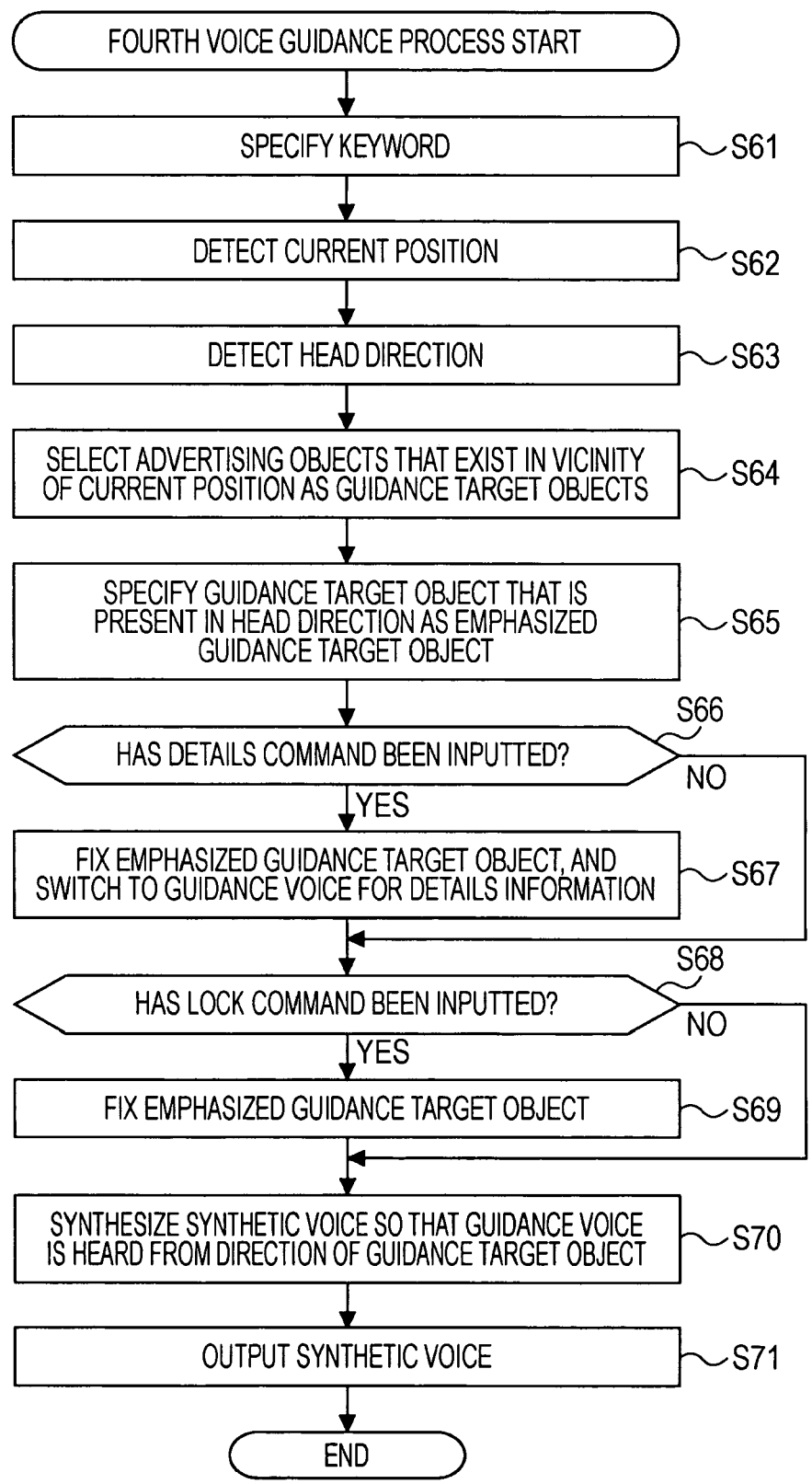
FIG. 9 is a flowchart showing a fourth voice guidance process using a portable information terminal.

FIG. 9 is a flowchart showing the fourth voice guidance process using the portable information terminal 1.

In step S61, (the keyword specifying section 161 of) the control section 64 of the portable telephone 11 specifies a predetermined keyword on the basis of a user's instruction made via the input section 66, and supplies the keyword to the guidance target object selecting section 164.

When wishing to find a cheap women's clothing store in the vicinity, for example, the user can specify simple words like "cheap women's clothing", for example, as a keyword.

In step S62, the current position detecting section 162 detects the current position of the portable telephone 11, on the basis of the latitude and longitude that are supplied from the GPS module 62 and the height that is measured by the sensor module 32.

In step S63, the head direction detecting section 163 detects the head direction of the user, on the basis of the up-down direction and the direction of the earth's magnetic field that are measured by the sensor module 32.

In step S64, the guidance target object selecting section 164 selects, from among advertisement target objects that exist within a predetermined range from the detected current position, an advertisement target object associated with the specified keyword as a guidance target object, and reads the position information of the selected guidance target object and the guidance voice data of an advertisement for the guidance target object from the memory 63.

Specifically, assuming a fixed range such as a range within a predetermined distance from the current position, for example, the guidance target object selecting section 164 selects, as guidance target objects, guidance candidate objects having position information indicating a position within that range, from among position information of guidance candidate objects stored in the memory 63.

Further, the guidance target object selecting section 164 selects a guidance candidate object having advertising contents including a specified keyword (for example, cheap, women's clothing) from among the contents (advertising contents) of guidance voices for the guidance candidate objects stored in the memory 63, and reads the position information of the guidance target object and its associated guidance voice data.

Upon selecting a guidance target object in this way, the guidance target object selecting section 164 detects the direction in which the guidance target objects exists with respect to the portable telephone 11 on the basis of the detected current position and position of the guidance target object, and on the basis of the detected direction and the head direction detected by the head direction detecting section 163, detects a head guidance target direction that is the direction of the guidance target object with respect to the head direction.

In step S65, the guidance target object selecting section 164 specifies, from among selected guidance target objects, a guidance target object that is present in the detected head direction as an emphasized guidance target object.

In step S66, the guidance target object selecting section 164 determines whether or not a details command has been inputted. If it is determined in step S66 that a details command has been inputted, in step S67, the guidance target object selecting section 164 fixes a guidance target object that is present in the head direction at that time as an emphasized guidance target object, and switches a guidance voice for the fixed guidance target object to a guidance voice for details information describing the details of an advertisement for that guidance target object.

On the other hand, if it determined in step S66 that a details command has not been inputted, step S67 is skipped.

It should be noted that the details command is a command that is inputted and recognized by a voice input device (not shown) of the input section 66 when the user says "Details", for example.

In step S68, the guidance target object selecting section 164 determines whether or not a lock command has been inputted. If it is determined in step S68 that a lock command has been inputted, in step S69, the guidance target object selecting section 164 fixes a guidance target object that is present in the head direction at that time as an emphasized guidance target object.

It should be noted that the lock command is inputted as, for example, a command corresponding to a user's operation of depressing a predetermined one of the buttons 24.

On the other hand, if it is determined in step S68 that a lock command has not been inputted, step S69 is skipped.

Then, in order to ensure that the guidance voice for the guidance target object specified as an emphasized guidance target object be emphasized over guidance voices for other guidance target objects, with respect to guidance voice data, the guidance target object selecting section 164 increases the volume of the guidance voice for the emphasized guidance target object, or mutes (silences) the volumes of the guidance voices for other guidance target objects or makes the volumes negligibly small. Then, after the DSP 65 waits for the data of the detected head guidance target direction to be supplied from the guidance target object selecting section 164 to the DSP 65 together with the guidance voice data of an advertisement for the guidance target object which is emphasized as appropriate, in step S70, as in the process of step S4 in FIG. 3, the DSP 65 generates a synthetic voice in such a way that a guidance voice is heard from the direction in which the guidance target object exists with respect to the head direction on the basis of the data of the head guidance target direction and guidance voice data supplied from the control section 64, and supplies the synthetic voice to the speaker 31 of the headphone 12.

In step S71, the speaker 31 of the headphone 12 outputs the synthesized synthetic voice.

The fourth voice guidance process is carried out in this way. It should be noted that the fourth voice guidance process is carried out continuously until, for example, a predetermined period of time elapses or until a predetermined command is inputted by the input section 66 (that is, the process of steps S61 to S71 is repeatedly carried out).

As described above, the portable information terminal 1 specifies a predetermined keyword, detects the current position of the portable telephone 11 and the head direction of the user, selects an advertisement target object associated with the specified keyword as a guidance target object from among advertisement target objects that exist within a predetermined range from the detected current position, and outputs the guidance voice for an advertisement for that guidance target object (advertisement target object) in such a way that the guidance voice is heard from the direction in which the guidance target object exists with respect to the head direction. Therefore, the user can easily acquire information of a desired advertisement in the vicinity of the current position, and also can easily grasp the position of the advertisement target object of that advertisement.

Further, the portable information terminal 1 is configured to specify a guidance target object that is present in the detected head direction as an emphasized guidance target object from among selected guidance target objects, and output a guidance voice for the guidance target object specified as an emphasized guidance target object in such a way that the guidance voice is emphasized over guidance voices for other guidance target objects.

Therefore, the user can mainly listen to the information of a desired advertisement by simply facing toward the direction from which the user hears the guidance voice of the desired advertisement from among advertisements for advertising objects in the vicinity, and thus can easily acquire the information of the desired advertisement.

Further, the guidance voice is heard from the direction in which the user faces his/her head, so the direction of the advertisement target object can be easily grasped.

While in the above-described fourth voice guidance process a voice guidance for a guidance target object that is present in the direction in which the user faces is emphasized, alternatively, it is of course possible to further select a guidance target object that is present in the direction in which the user faces, and provide voice guidance only with respect to a guidance voice for that guidance target object, for example.

Further, the advertiser of an advertisement target object for which voice guidance has been provided is notified of the fact that the voice guidance has been provided, and is charged accordingly. The present invention can be thus applied to advertisement business.

Further, when the details command is inputted, a guidance target object that is present in the head direction at that time is fixed as an emphasized guidance target object, a guidance voice for the guidance target object fixed as the emphasized guidance target object is switched to a guidance voice for details information describing the details of an advertisement for the guidance target object, and the guidance voice for the details information of the guidance target object is emphasized and heard from the direction in which the guidance target object is present. Therefore, the user can easily acquire information of an advertisement whose details the user wants to know by simply facing toward the direction from which the user hears the guidance voice of that advertisement and inputting a predetermined command. Further, even when the head direction changes, the guidance voice for details information is heard being emphasized as it is, thereby making it possible to prevent the volume of the guidance voice for necessary details information from becoming smaller when the user inadvertently changes the direction the user faces.

When the details command is inputted, a guidance target object that is present in the head direction at that time is fixed as an emphasized guidance target object, and the guidance voice for an advertisement for the guidance target object (advertisement target object) is emphasized and heard from the direction in which the guidance target object is present, that is, the volume of the guidance voice for the guidance target object is maintained, thereby making it possible to prevent the volume of a necessary guidance voice from becoming smaller when the user inadvertently changes the direction the user faces.

While the guidance target object selecting section 164 is configured to switch a guidance voice for a guidance target object that is present in the head direction at that time to a guidance voice for details information describing the details of an advertisement for the guidance target object and emphasize the guidance voice upon input of a details command, alternatively, for example, information associated with that guidance target object, such as test or image data accompanying the details information or the like may be acquired from the server 51 via the base station 52 and displayed on, for example, the display screen of the display device 23.

Further, as described above, a guidance voice for an advertisement for an advertisement target object that is present in the vicinity of the current position is outputted, so a potential customer within a short distance from an advertising object can be guided toward the advertisement target object, thereby making it possible for the advertiser to provide an effective advertisement.

The information provider managing the server 51 may sign a contract with an advertiser so that only information of the advertiser who has a contract with the server 51 is provided to the portable information terminal such as the portable information terminal 1. Further, the advertising rates to be charged to the advertiser may be determined in accordance with, for example, the size of the advertising area desired by the advertiser.

The portable information terminal 1 may be also configured such that the above-described advertising area is acquired from the server 51 and stored in advance, and when the current position detected by the current position detecting section 162 has entered the advertising area, an advertisement target object of that advertiser is selected by the guidance target object selecting section 164. Then, when it is regarded that the guidance voice for an advertisement for the advertiser or advertisement target object has been outputted, a notification to that effect is transmitted to the server 51 by the notifying section 165. The charging processing section 151 of the server 51 can charge the advertiser on the basis of this notification.

If the accuracy of position detection using the GPS is not sufficient, for example, a transmitter-receiver such as a wireless LAN may be installed in the store or the like (advertisement target object) of the advertiser. Then, if the communicable distance between a portable information terminal such as the portable information terminal 1 or the like and the transmitter-receiver is relatively short, the user is regarded as having entered the store (advertisement target object) where the transmitter-receiver is installed when communication has taken place between the portable information terminal and the transmitter-receiver, and a notification to that effect is sent to the server 51. Then, the charging processing section 151 of the server 51 can charge the advertiser on the basis of this notification.

For example, the server 51 can charge an advertiser by setting up a system in which when the user purchases an item from the store of the advertiser after a notification that the user of the portable information terminal 1 has used an advertisement is transmitted, if that purchase (payment) is made electronically, the server is notified of the results of the electronic payment.

Accordingly, for example, an electronic payment function like that of Osaifu-Keitai® (wallet mobile phone) may be added to the portable information terminal 1 so that the portable information terminal 1 is notified of the results of electronic payment. It should be noted that examples of electronic payment include those using electronic money such as Edy®, credit cards, and the like.

When using these electronic payment services, the above-described notification is transmitted to the server 51 from devices that carry out those electronic payments.

Alternatively, an arrangement is also possible in which a transmitter-receiver such as a wireless LAN is placed near the cashier in a store, and when the transmitter-receiver communicates with a portable information terminal such as the portable information terminal 1 and thus it is regarded that the user of that portable information terminal has made a payment, a notification to that effect is transmitted from the transmitter-receiver or that portable information terminal to the server 51.

In a case where a payment function is added to the portable information terminal 1, it is necessary to encourage the user of the portable information terminal 1 to purchase items by using the payment function. To this end, for example, prices of items may be reduced by several percents for purchases made by using the payment function.

Next, referring to FIG. 10, a description will be given of another example of the configuration of the voice guidance system 50 using the portable information terminal 1.

Figure 10:
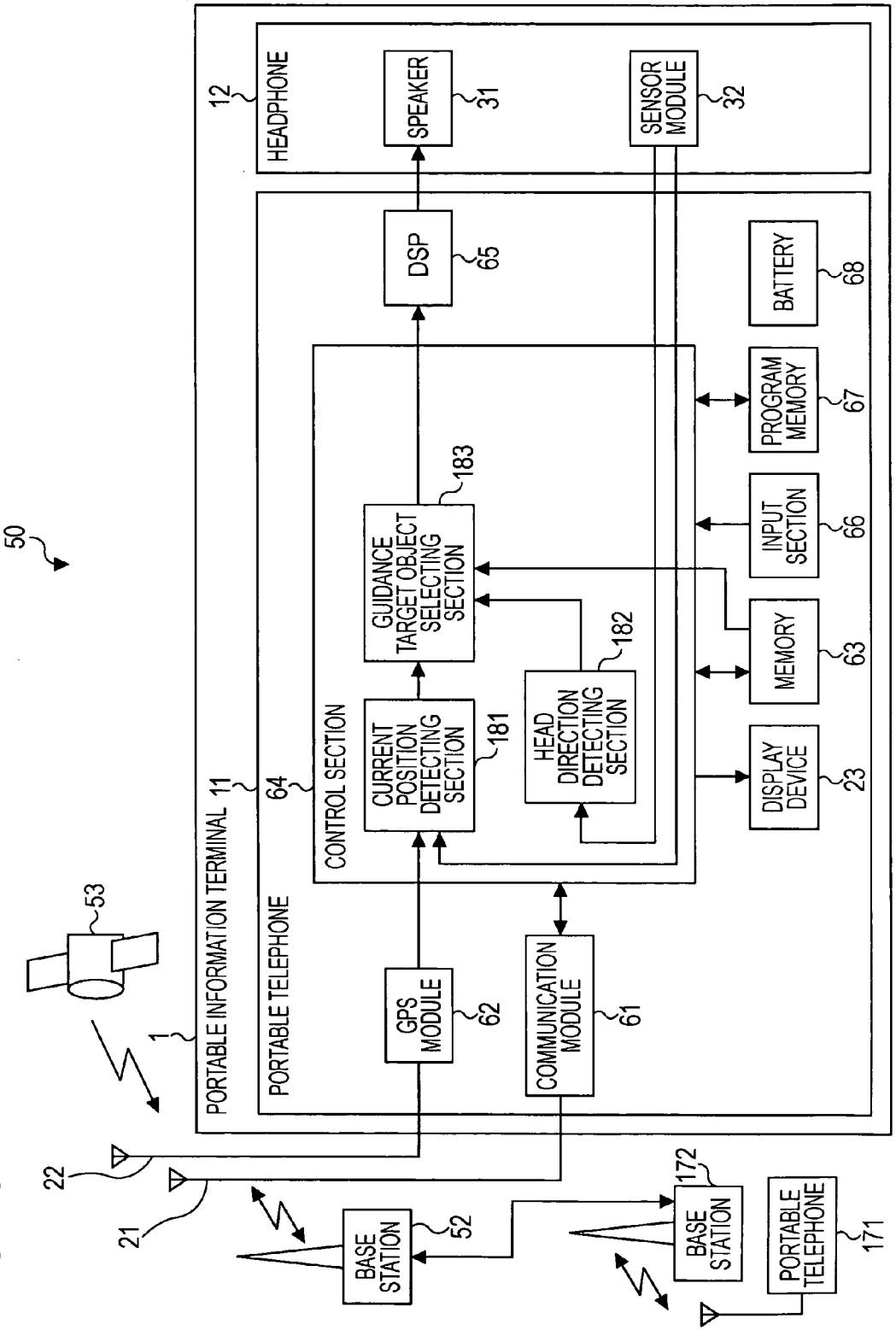
FIG. 10 is a diagram showing an example of the configuration of a voice guidance system.

It should be noted that in FIG. 10, portions corresponding to those of the voice guidance system 50 shown in FIG. 2 are denoted by the same reference numerals, and description thereof is omitted as appropriate. That is, in the voice guidance system 50 shown in FIG. 10, a portable telephone 171 and a base station 172 are provided, and the server 51 shown in FIG. 2 is omitted. Further, in the control section 64 of the portable telephone 11, a current position detecting section 181, a head direction detecting section 182, and a guidance target object selecting section 183 are provided instead of the current position detecting section 71, head direction detecting section 72, and guidance target object selecting section 73 of the control section 64 shown in FIG. 2.

The base station 172 is a base station for the portable telephone 171 or the like, and performs wireless communication with the portable telephone 171. Further, the base station 172 is wireless- or wire-connected to the base station 52.

The portable telephone 11 is engaged in a call with the portable telephone 171 of the same specifications (for example, specifications for transmitting a call voice together with its position information) via the base station 52 and the base station 172.

The portable information terminal 1 selects a portable telephone (for example, the portable telephone 171) that is engaged in a call with the portable telephone 11 as a guidance target object, and outputs a guidance voice (for example, a call voice from the portable telephone 171) for that guidance target object to the user from the speaker 31 of the headphone 12 in such a way that the guidance voice is heard from the direction in which the guidance target object is present.

Hereinbelow, a process whereby a guidance voice (for example, a call voice) for a portable telephone as a guidance target object engaged in a call with the portable telephone 11 is outputted in a such a way that the guidance voice is heard from the direction in which the guidance target object is present, is referred to as a fifth voice guidance process.

The current position detecting section 181 of the control section 64 of the portable telephone 11 detects the current position of the portable telephone 11 on the basis of the latitude and longitude that are supplied from the GPS module 62 and the height that is measured by the sensor module 32, and supplies the detected current position to the guidance target object selecting section 183.

The head direction detecting section 182 detects the head direction of the user on the basis of the up-down direction and the direction of the earth's magnetic field that are measured by the sensor module 32, and supplies the detected head direction to the guidance target object selecting section 183.

The guidance target object selecting section 183 selects, for example, the portable telephone 171 that is engaged in a call with the portable telephone 11 as a guidance target object, and acquires the voice data of a call voice as guidance voice data from the portable telephone 171 and the position information of the portable telephone 171, which are supplied from the communication module 61. It should be noted that, for example, a telephone number for identifying the portable telephone 171 is assigned to the voice data of the call voice from the portable telephone 171 and the position information of the portable telephone 171.

Further, the guidance target object selecting section 183 detects the direction in which the guidance target object exists with respect to the portable telephone 11 on the basis of the detected current position and position of the guidance target object, and on the basis of the detected direction and the head direction detected by the head direction detecting section 182, detects a head guidance target direction that is the direction of the guidance target object with respect to the head direction.

Further, the guidance target object selecting section 183 supplies the data of the detected head guidance target direction to the DSP 65 together with the guidance voice data (voice data of a call voice) of its associated guidance target object.

Figure 11:
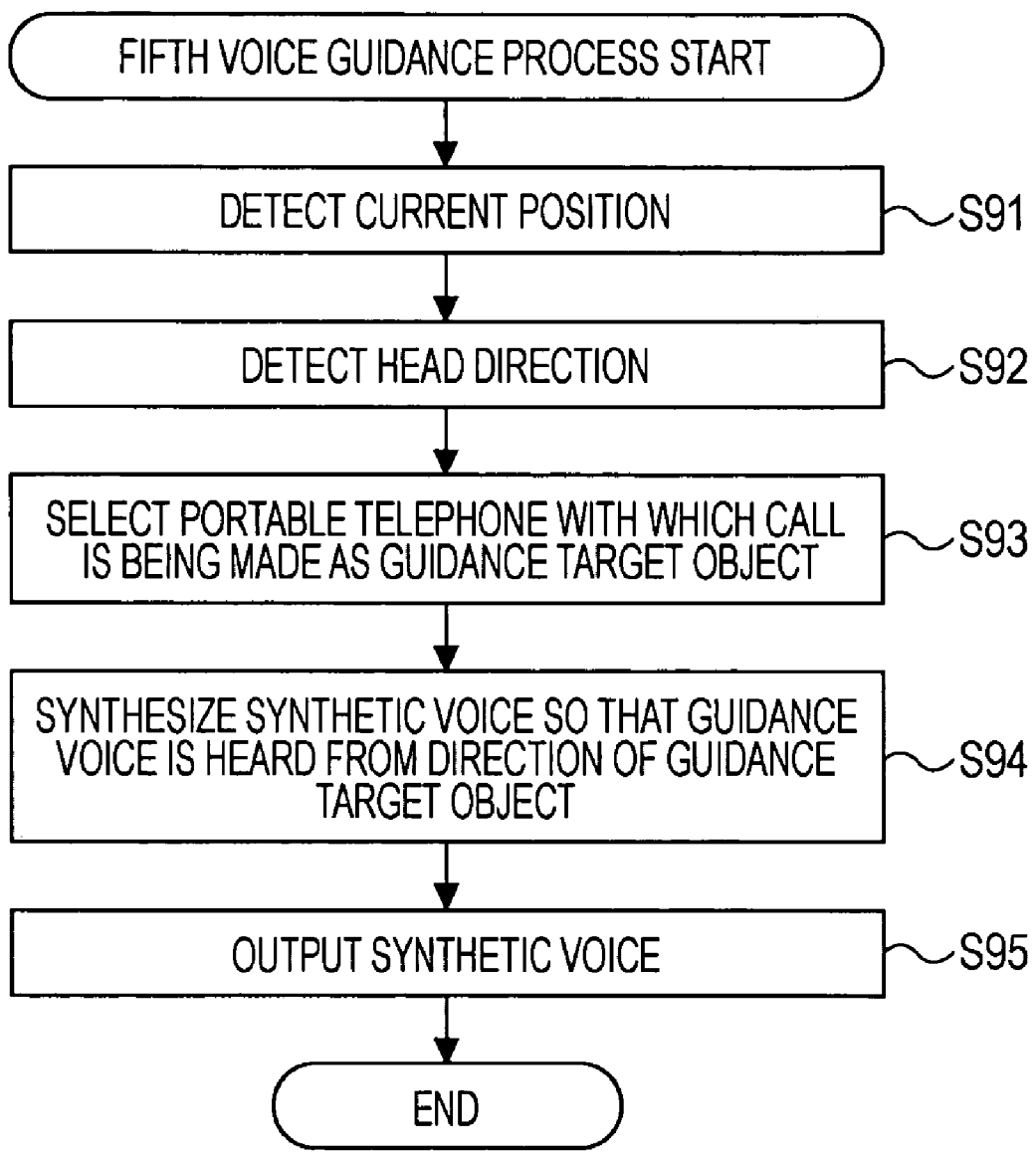
FIG. 11 is a flowchart showing a fifth voice guidance process using a portable information terminal.

FIG. 11 is a flowchart showing the fifth voice guidance process using the portable information terminal 1.

In step S91, the current position detecting section 181 detects the current position of the portable telephone 11 on the basis of the latitude and longitude that are supplied from the GPS module 62 and the height that is measured by the sensor module 32.

In step S92, the head direction detecting section 182 detects the head direction of the user on the basis of the up-down direction and the direction of the earth's magnetic field that are measured by the sensor module 32.

In step S93, the guidance target object selecting section 183 selects, for example, the portable telephone 171 that is engaged in a call with the portable telephone 11 as a guidance target object, and acquires the voice data of a call voice as guidance voice data from the portable telephone 171 and the position information of the portable telephone 171, which are supplied from the communication module 61. Further, the guidance target object selecting section 183 detects the direction in which the guidance target object (portable telephone 171) exists with respect to the portable telephone 11 on the basis of the detected current position and position of the guidance target object, and on the basis of that direction and the detected head direction, detects a head guidance target direction that is the direction of the guidance target object with respect to the head direction.

In step S94, on the basis of the data of the head guidance target direction and guidance voice data that are supplied from the control section 64, the DSP 65 generates a synthetic voice in such a way that a guidance voice is heard from the direction in which the guidance target object exists with respect to the head direction, and supplies the synthetic voice to the speaker 41 of the headphone 12.

In step S95, the speaker 31 of the headphone 12 outputs the synthesized synthetic voice.

The fifth voice guidance process is carried out in this way. It should be noted that the fifth voice guidance process is carried out continuously until, for example, a predetermined period of time elapses or until a predetermined command is inputted by the input section 66 (that is, the process of steps S91 to S95 is repeatedly carried out).

As described above, the portable information terminal 1 is configured to detect the current position of the portable telephone 11 and the head direction of the user, select a portable telephone that is engaged in a call with the portable telephone 11, and output a call voice from the portable telephone in such a way that the call voice is heard from the direction in which the portable telephone exists with respect to the head direction. Therefore, for example, when looking for a friend while talking with the friend on a portable telephone in the vicinity of a meeting place, the user can easily grasp where the friend is, while making a call.

It should be noted that the fifth voice guidance process can be started at arbitrary timing during a call, on the basis of a user's instruction made via the input section 66, for example.

While in the above-described example a call voice is used as the guidance voice, for example, a simple chime sound or the like may be used instead. Alternatively, as for the call voice during a normal call, a call voice with no sense of direction may be heard, and as for the call voice during the fifth voice guidance process, a call voice with a sense of direction may be heard from the direction of a portable information terminal that is engaged in a call.

Further, while the guidance target object is a portable information terminal engaged in a call in the above-described example, alternatively, for example, the guidance target object may be an object that can be easily lost such as a remote controller or a wallet to which a communication section such as a wireless tag is attached.

When looking for a lost object in a messy room or the like, a guidance voice such as "it is here", which is transmitted from the lost object, may be heard from the position of the lost object, for example.

While the foregoing description is directed to a configuration in which the portable information terminal 1 has the head direction detecting section that detects the head direction of the user, it is also possible to adopt a configuration in which the portable information terminal 1 does not have the head direction detecting section.

Further, in the portable information terminal 1, a synthetic voice is generated by the DSP 65 in such a way that a guidance voice is heard from an arbitrary direction in a three-dimensional space (such a synthetic voice is referred to as quasi three-dimensional voice). However, the configuration of the portable information terminal 1 may be simplified so that the DSP 65 is not used, and a synthetic voice is generated by the control section 64 in such a way that a guidance voice is heard from an arbitrary direction within a horizontal plane, for example.

Figure 12:
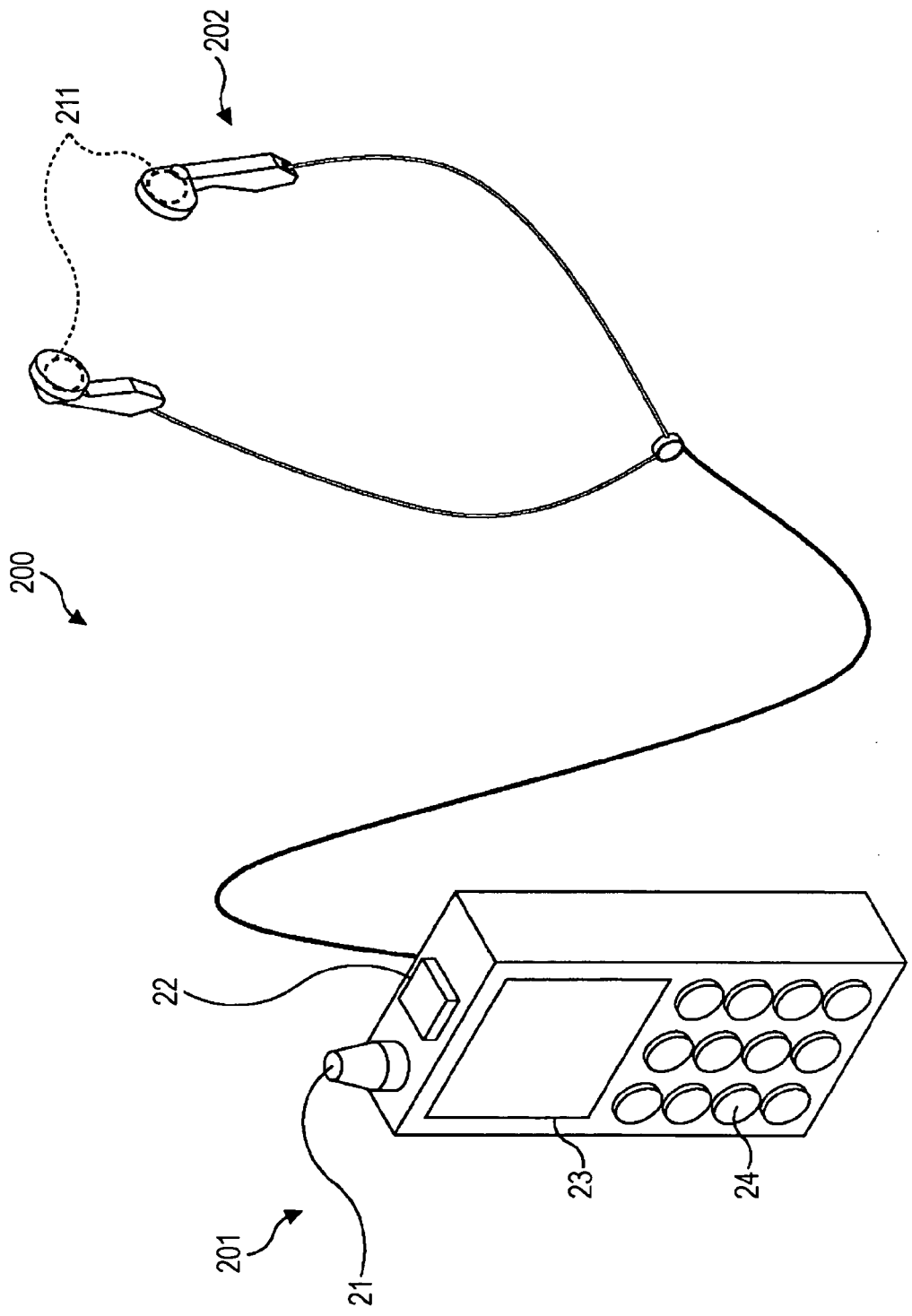
FIG. 12 is a view showing an example of the outward appearance of a portable information terminal.

FIG. 12 shows an example of the outward appearance of a portable information terminal 200 whose configuration is simplified in this way. The portable information terminal 200 includes a portable telephone 201 and a headphone 202 that are connected to each other via a detachable cable.

It should be noted that in FIG. 12, portions corresponding to those of the portable information terminal 1 shown in FIG. 1 are denoted by the same reference numerals, and description thereof is omitted as appropriate.

The headphone 202 includes, for example, two earphones. A speaker 211 is mounted inside each of the two earphones. The sensor module 32 mounted to the headphone 12 is not provided.

Next, referring to FIG. 13, a description will be given of an example of the configuration of a voice guidance system 250 using the portable information terminal 200.

Figure 13:
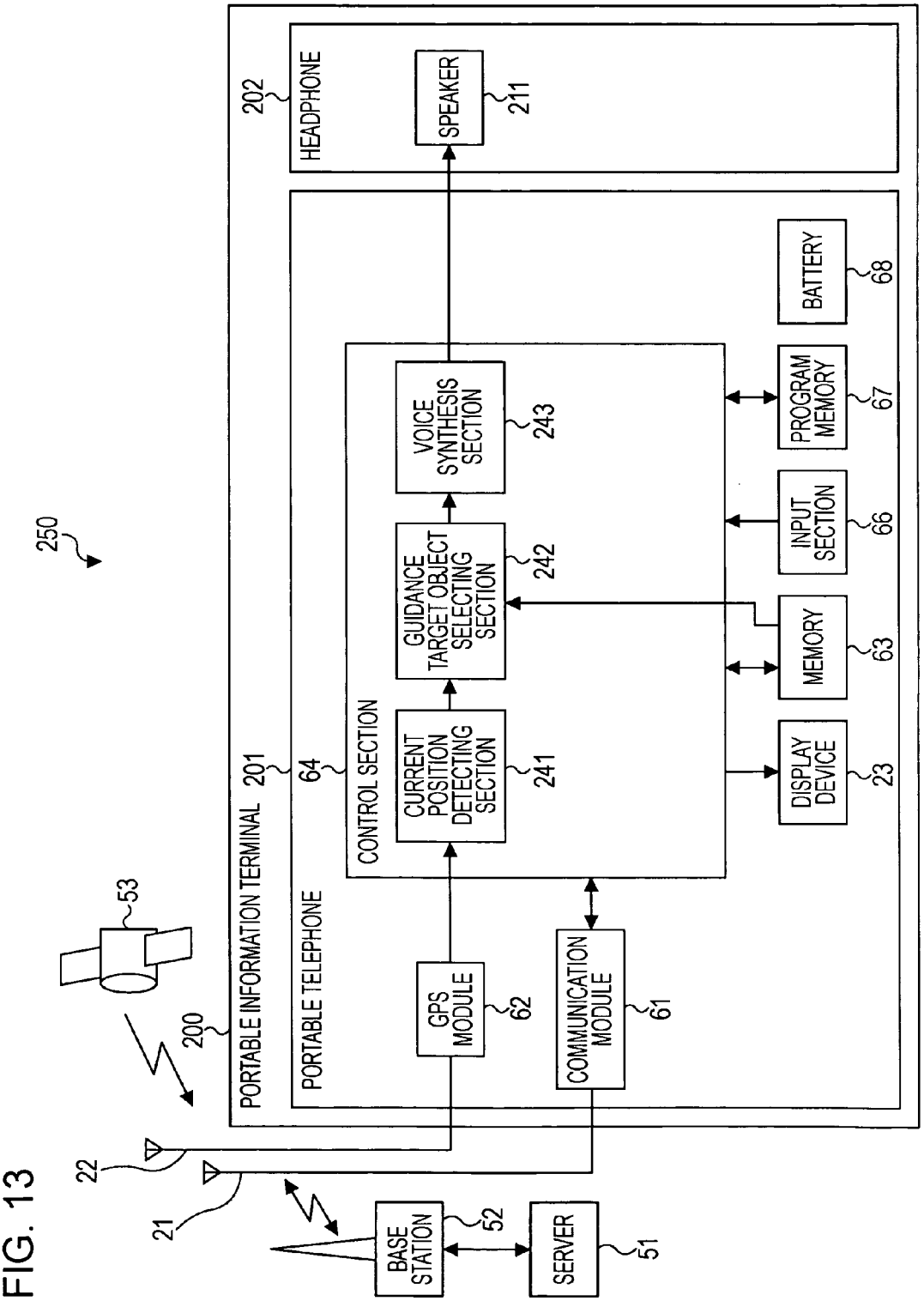
FIG. 13 is a diagram showing an example of the configuration of a voice guidance system.

It should be noted that in FIG. 13, portions corresponding to those of the voice guidance system 50 shown in FIG. 2 are denoted by the same reference numerals, and description thereof is omitted as appropriate. That is, in the portable telephone 201 of the portable information terminal 200 shown in FIG. 13, the DSP 65 of the portable telephone 11 shown in FIG. 2 is omitted. In the control section 64 of the portable telephone 201, a current position detecting section 241, a guidance target object selecting section 242, and a voice synthesis section 243 are provided instead of the current position detecting section 71, head direction detecting section 72, and guidance target object selecting section 73 of the control section 64 shown in FIG. 2.

In the example shown in FIG. 13, for example, a guidance voice associated with a predetermined object or place (for example, a train station or a bus stop) that exists in the vicinity of the current position of the portable information terminal 201 detected on the basis of a GPS signal from the GPS satellite 53, is outputted from the speaker 211 of the headphone 202 to the user in such a way that the guidance voice is heard from the direction in which the predetermined object exists.

Hereinbelow, the above-described process whereby a guidance voice for a predetermined object that exists in the vicinity of the current position is outputted to the user in such a way that the guidance voice is heard from a direction within a horizontal plane in which the predetermined object exists, is referred to as a sixth voice guidance process.

The current position detecting section 241 detects the current position of the portable telephone 201 on the basis of the latitude and longitude that are supplied from the GPS module 62 and the height that is measured by the sensor module 32, and supplies the detected current position to the guidance target object selecting section 242.

The guidance target object selecting section 242 selects a guidance target object that exists in the vicinity of the current position supplied from the current position detecting section 241, for example, and reads the position of the guidance target object and its guidance voice data from the memory 63. On the basis of the detected current position and position of the guidance target object, the guidance target object selecting section 242 detects the direction in which the guidance target object exists with respect to the portable telephone 201, and on the basis of the detected direction and the direction of travel, detects a guidance target travel direction that is the direction of the guidance target object with respect to the direction of travel (serving as a reference). The guidance target object selecting section 242 then supplies the resulting data to the voice synthesis section 243 together with guidance voice data of that guidance target object.

Here, the direction of travel is detected as, for example, the direction of movement within a horizontal plane in a predetermined period of time, on the basis of the latitude and longitude that are detected by the GPS module 62 or the current position detecting section 241, and the latitude and longitude that were detected by the GPS module 62 or the current position detecting section 241 at a time that precedes the current time by the predetermined period of time.

On the basis of the guidance target travel direction and guidance voice data supplied from the guidance target object selecting section 242, the voice synthesis section 243 generates a synthetic voice in such a way that a guidance voice is heard from the direction in which a guidance target object exists with respect to the travel direction, and supplies the synthetic voice to the speaker 211 of the headphone 202.

Figure 14:
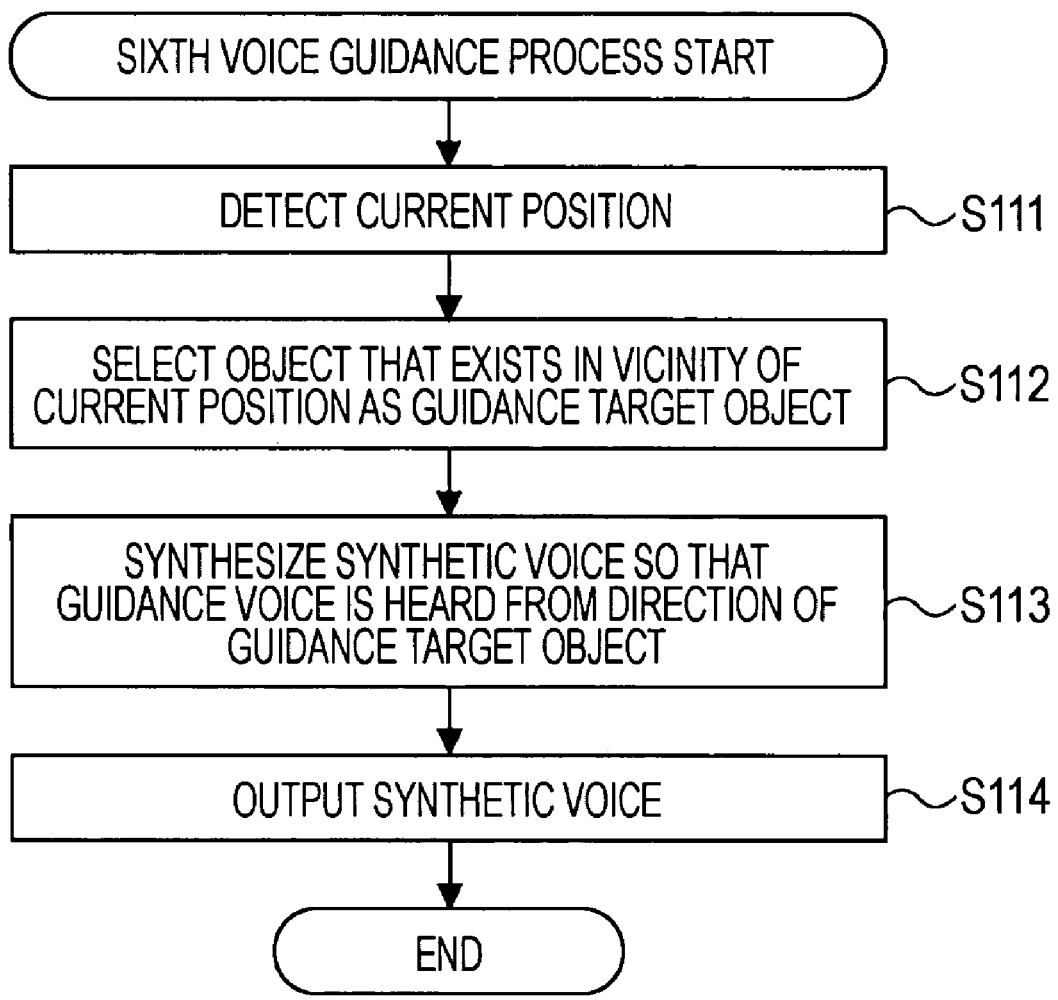
FIG. 14 is a flowchart showing a sixth voice guidance process using a portable information terminal.

Next, referring to the flowchart of FIG. 14, the sixth voice guidance process using the portable information terminal 200 will be descried.

In step S111, the current position detecting section 241 detects the current position of the portable telephone 201 on the basis of the latitude and longitude that are supplied from the GPS module 62 and the height that is measured by the sensor module 32.

In step S112, the guidance target object selecting section 242 selects a guidance target object that exists in the vicinity of the detected current position, and reads the position of the guidance target object and its guidance voice data from the memory 63. On the basis of the detected current position and position of the guidance target object, the guidance target object selecting section 242 detects the direction in which the guidance target object exists with respect to the portable telephone 201, and on the basis of the detected direction and the direction of travel, detects a guidance target travel direction that is the direction of the guidance target object with respect to the direction of travel. The guidance target object selecting section 242 then supplies the resulting data to the voice synthesis section 243 together with guidance voice data of that guidance target object.

In step S113, on the basis of the guidance target travel direction and guidance voice data supplied from the guidance target object selecting section 242, the voice synthesis section 243 generates a synthetic voice in such a way that a guidance voice is heard from the direction in which the guidance target object exists with respect to the travel direction, and supplies the synthetic voice to the speaker 211 of the headphone 202.

Specifically, the voice synthesis section 243 generates a synthetic voice by, for example, applying an increase/decrease to the volume of the guidance voice data supplied from the guidance target object selecting section 242 so that a user who is facing the direction of travel hears a guidance voice from the direction of a guidance target object with respect to the direction of travel.

In step S114, the speaker 211 of the headphone 202 outputs the synthesized synthetic voice. The sixth voice guidance process ends when a synthetic voice is outputted in this way.

As described above, the portable information terminal 200 detects the current position of the portable telephone 201, selects a guidance target object that exists in the vicinity of the detected current position, and outputs a guidance voice for that guidance target object in such a way that the guidance voice is heard the direction in which the guidance target object exists with respect to the direction of travel. Therefore, even a user who is not familiar with the vicinity can easily acquire information on the vicinity, and since a guidance voice is heard from the actual direction of a guidance target object, the user can grasp the position of the object more easily.

In this way, a guidance voice can be outputted in such a way that the guidance voice is heard from an arbitrary direction within a horizontal plane in a three-dimensional space of a guidance target object, for example, by using a portable information terminal with GPS function and a headphone that are commonly used, without using a DSP that performs synthesis of a quasi three-dimensional voice and a headphone having various sensors built therein.

Examples of the technique for synthesizing a quasi three-dimensional voice include VPT (Virtual Phones Technology).

While in the above-mentioned example the selection of a guidance target object and the synthesis of a synthetic voice are performed by the portable telephone 201, as shown in FIG. 15, those processes may be performed by the server 51.

Next, referring to FIG. 15, an example of the configuration of such a voice guidance system 250 will be described.

It should be noted that in FIG. 15, portions corresponding to those in FIG. 13 are denoted by the same reference numerals, and description thereof is omitted as appropriate.

In FIG. 15, the guidance target object selecting section 242 and voice synthesis section 243 of the portable information terminal 200 in FIG. 13 are provided in the server 51. Therefore, the server 51 and the portable information terminal 200 in FIG. 15 can provide voice guidance in the same manner as the portable information terminal 200 in FIG. 13. Hereinbelow, a process performed by the server 51 and the portable information terminal 200 whereby a guidance voice for a predetermined object that exists in the vicinity of the current position is outputted in such a way that the guidance voice is heard the direction in which the predetermined object exists, is referred to as a seventh voice guidance process.

Referring to the flowchart of FIG. 16, the operations of the server 51 and portable information terminal 200 in the seventh voice guidance process will be described.

First, the operation of the portable information terminal 200 will be described.

It should be noted that position information and guidance voice data of guidance target objects are stored in association with each other in a storage section (not shown) of the server 51.

In step S131, the current position detecting section 241 detects the current position of the portable telephone 201 on the basis of the latitude and longitude that are supplied from the GPS module 62 and the height that is measured by the sensor module 32, and supplies the detected current position to the guidance target object selecting section 242.

In step S132, the control section 64 transmits the detected current position to the server 51 via the base station 52.

In step S133, the control section 64 receives via the base station 52 a synthetic voice transmitted from the server 51, and supplies the synthetic voice to the headphone 202.

In step S134, the speaker 211 of the headphone 202 outputs the synthetic voice supplied from the control section 64. The seventh voice guidance process ends when the synthetic voice is outputted in this way.

Next, the operation of the server 51 will be described.

In step S151, the server 51 receives the current position of the portable telephone 201, which is transmitted from the portable information terminal 200 via the base station 52.

In step S152, the guidance target object selecting section 242 selects a guidance target object that exists in the vicinity of the received current position of the portable telephone 201, and reads the position of the guidance target object and its guidance voice data from a storage section (not shown). On the basis of the received current position of the portable telephone 201 and the position of the guidance target object, the guidance target object selecting section 242 detects the direction in which the guidance target object exists with respect to the portable telephone 201, and on the basis of the detected direction and the direction of travel, detects a guidance target travel direction that is the direction of the guidance target object with respect to the direction of travel. The guidance target object selecting section 242 then supplies the resulting data to the voice synthesis section 243 together with guidance voice data of that guidance target object.

In step S153, on the basis of the guidance target travel direction and guidance voice data supplied from the guidance target object selecting section 242, the voice synthesis section 243 generates a synthetic voice in such a way that a guidance voice is heard from the direction in which the guidance target object exists with respect to the travel direction.

In step S154, the server 51 transmits the synthesized synthetic voice to the portable information terminal 200 via the base station 52.

As described above, the server 51 and the portable information terminal 200 each detect the current position of the portable telephone 201, select a guidance target object that exists in the vicinity of the detected current position, and output a guidance voice for that guidance target object in such a way that the guidance voice is heard the direction in which the guidance target object exists with respect to the direction of travel. Therefore, for example, even a user who is not familiar with the vicinity can easily acquire information on the vicinity, and since a guidance voice is heard from the actual direction of the guidance target object, the user can grasp the position of the object more easily.

As described above, functions such as voice synthesis and selection of a guidance target object which are not included in an ordinary portable information terminal are handled by an information provider, thus allowing the user to receive voice guidance services with minimum investment.

Further, guidance target objects can be automatically narrowed down to an object associated with a specified keyword, an object in the vicinity of a detected current position, an object that is present in the head direction of the user, or the like. The user can thus easily acquire desired information by making a simple search, without the trouble of, for example, repeating the operation of selecting a link displayed on a display screen over and over as in the related art.

Since guidance on information associated with an object is given by voice, the user can acquire information without looking at an image, text, or the like displayed on a display screen, thus allowing the user to acquire information safety even when, for example, the user is moving.

It should be noted that the program to be executed by the computer may be a program in which processes are carried out in times series in the order as they appear in this specification, or may be a program in which processes are carried out in parallel or at required timing such as when invoked.

It is to be understood that the present invention is not limited to the above-mentioned embodiments, and various modifications are possible without departing from the scope of the present invention.

What is claimed is:

1. A portable information terminal comprising:
    a position detecting section to detect a position of the portable information terminal;
    a selecting section to select a guidance target object for which voice guidance is to be provided, and to detect a guidance target direction that is a first direction in which the guidance target object exists with respect to a reference direction, based at least in part on a second direction in which the guidance target object exists with respect to the position of the portable information terminal;
    a voice synthesis section to generate a synthetic voice so that a guidance voice for the guidance target object selected by the selecting section is heard from the guidance target direction; and
    a voice output section to output the synthetic voice generated by the voice synthesis section.

2. The portable information terminal according to claim 1, wherein:
    the selecting section selects the guidance target object on the basis of a position of the portable information terminal.

3. The portable information terminal according to claim 1, wherein:
    the voice output section is a headphone that is worn by a user;
    the portable information terminal further includes a head direction detecting section to detect the head direction that is a third direction in which a head of the user faces; and
    the voice synthesis section generates the synthetic voice so that the guidance voice for the guidance target object is heard from the first direction in which the guidance target object exists with respect to the head direction.

4. The portable information terminal according to claim 3, wherein:
    the selecting section selects the guidance target object based at least in part on the head direction.

5. The portable information terminal according to claim 3, wherein:
    the selecting section selects the guidance target object based at least in part on the position of the portable information terminal and the head direction.

6. The portable information terminal according to claim 3, wherein the voice synthesis section generates the synthetic voice so as to emphasize a volume of the guidance voice for the guidance target object that is present in the head direction.

7. The portable information terminal according to claim 6, further comprising:
    an input section to input a command specified by the user, wherein
    when a predetermined command is inputted by the input section, the voice synthesis section generates the synthetic voice so that the volume of the guidance voice for the guidance target object is maintained.

8. The portable information terminal according to claim 6, further comprising:
an input section to input a command specified by the user, wherein
when a predetermined command is inputted by the input section, the voice synthesis section generates the synthetic voice so as to switch to a guidance voice for providing details information describing details of guidance given by the guidance voice for the guidance target object.

9. The portable information terminal according to claim 8, wherein when a predetermined command is inputted by the input section, the voice synthesis section generates the synthetic voice so that a volume of the guidance voice for providing the details information is maintained.

10. The portable information terminal according to claim 6, further comprising:
an input section to input a command specified by the user; and
a display section to display details information describing details of guidance given by the guidance voice for the guidance target object when a predetermined command is input by the input section.

11. The portable information terminal according to claim 1, further comprising:
a specifying section to specify a keyword based at least in part on an instruction of a user, wherein
the selecting section selects the guidance target object based at least in part on the keyword specified by the specifying section.

12. The portable information terminal according to claim 1, further comprising:
an acquiring section to acquire position information of objects, wherein
the selecting section selects the guidance target object, from among the objects of which the position information has been acquired by the acquiring section.

13. The portable information terminal according to claim 1, further comprising:
at least one storage medium to store position information of objects in advance, wherein
the selecting section selects the guidance target object from among the objects of which the position information is stored in the at least one storage medium.

14. The portable information terminal according to claim 1, wherein:
the voice synthesis section generates the synthetic voice as a quasi three-dimensional voice.

15. A control method for controlling a portable information terminal, the control method comprising:
detecting a position of the portable information terminal;
selecting a guidance target object for which voice guidance is to be provided, and detecting a guidance target direction that is a first direction in which the guidance target object exists with respect to a reference direction, based at least in part on a second direction in which the guidance target object exists with respect to the position of the portable information terminal;
generating a synthetic voice so that a guidance voice for the selected guidance target object is heard from the guidance target direction; and
outputting the synthetic voice.

16. An information providing device that provides information to a portable information terminal, the information providing device comprising:
a receiving section to receive a position of the portable information terminal transmitted from the portable information terminal;
a selecting section to select a guidance target object for which voice guidance is to be provided, and to detect a guidance target direction that is a first direction in which the guidance target object exists with respect to a reference direction, based at least in part on a second direction in which the guidance target object exists with respect to the position of the portable information terminal;
a voice synthesis section to generate a synthetic voice so that a guidance voice for the guidance target object selected by the selecting section is heard from the guidance target direction; and
a transmitting section to transmit the synthetic voice generated by the voice synthesis section, which is to be outputted by the portable information terminal, to the portable information terminal.

17. A control method for an information providing device that provides information to a portable information terminal, the control method comprising:
receiving a position of the portable information terminal transmitted from the portable information terminal;
selecting a guidance target object for which voice guidance is to be provided, and detecting a guidance target direction that is a first direction in which the guidance target object exists with respect to a reference direction, based at least in part on a second direction in which the guidance target object exists with respect to the position of the portable information terminal;
generating a synthetic voice so that a guidance voice for the guidance target object is heard from the guidance target direction; and
transmitting the synthetic voice, which is to be outputted by the portable information terminal, to the portable information terminal.

18. A portable information terminal to which information is provided from an information providing device, the portable information terminal comprising:
a position detecting section to detect a position of the portable information terminal;
a transmitting section to transmit the position of the portable information terminal detected by the position detecting section to the information providing device;
a receiving section to receive from the information providing device a synthetic voice generated so that a guidance voice for a guidance target object for which guidance is to be provided is heard from a first direction in which the guidance target object exists with respect to a reference direction and which is detected based at least in part on the position of the portable information terminal transmitted by the transmitting section; and
a voice output section to output the synthetic voice received by the receiving section.

19. A control method for a portable information terminal to which information is provided from an information providing device, the control method comprising:
detecting a position of the portable information terminal;
transmitting the position of the portable information terminal to the information providing device;
receiving from the information providing device a synthetic voice generated so that a guidance voice for a guidance target object for which guidance is to be provided is heard from a first direction in which the guidance target object exists with respect to a reference direction and which is detected based at least in part on the position of the portable information terminal; and
outputting the synthetic voice.

* * * * *